United States Patent
Rinner et al.

(10) Patent No.: US 9,411,379 B2
(45) Date of Patent: Aug. 9, 2016

(54) PORTABLE ELECTRONIC DEVICE PRIVACY SYSTEM

(71) Applicants: James A. Rinner, Franksville, WI (US); Kimberly A. Rinner, Franksville, WI (US)

(72) Inventors: James A. Rinner, Franksville, WI (US); Kimberly A. Rinner, Franksville, WI (US)

( * ) Notice: Subject to any disclaimer, the term of this patent is extended or adjusted under 35 U.S.C. 154(b) by 5 days.

(21) Appl. No.: 14/475,574

(22) Filed: Sep. 3, 2014

(65) Prior Publication Data
US 2015/0059251 A1  Mar. 5, 2015

Related U.S. Application Data

(60) Provisional application No. 61/873,691, filed on Sep. 4, 2013.

(51) Int. Cl.
H04M 1/00  (2006.01)
G06F 1/16  (2006.01)
H04M 1/02  (2006.01)
H04B 1/3888  (2015.01)

(52) U.S. Cl.
CPC ............ G06F 1/1656 (2013.01); H04B 1/3888 (2013.01); H04M 1/0283 (2013.01); *G06F 2200/1633* (2013.01)

(58) Field of Classification Search
CPC ......... G06F 1/1656; G06F 2200/1633; H04M 1/0283; H04B 1/3888
USPC ................................. 455/575.8, 575.1, 550.1
See application file for complete search history.

(56) References Cited

U.S. PATENT DOCUMENTS

2007/0242948 A1* 10/2007 Miramontes ........... G03B 17/00 396/448
2011/0058255 A1*  3/2011 Weiss .................. H04M 1/0264 359/511
2013/0088813 A1*  4/2013 Su ......................... G06F 1/1628 361/679.01
2014/0198439 A1*  7/2014 De Pietro .............. G06F 1/1686 361/679.02
2015/0311941 A1* 10/2015 Sorrentino ............ H04M 1/185 455/575.8

* cited by examiner

Primary Examiner — Khai M Nguyen
(74) Attorney, Agent, or Firm — BrainSpark Associates, LLC

(57) ABSTRACT

Disclosed are devices, systems and methods for inhibiting, preventing and/or hindering eavesdropping or accidental use of cameras and microphones of a portable electronic device (PED), in order to assist the user with maintaining their personal privacy.

16 Claims, 19 Drawing Sheets

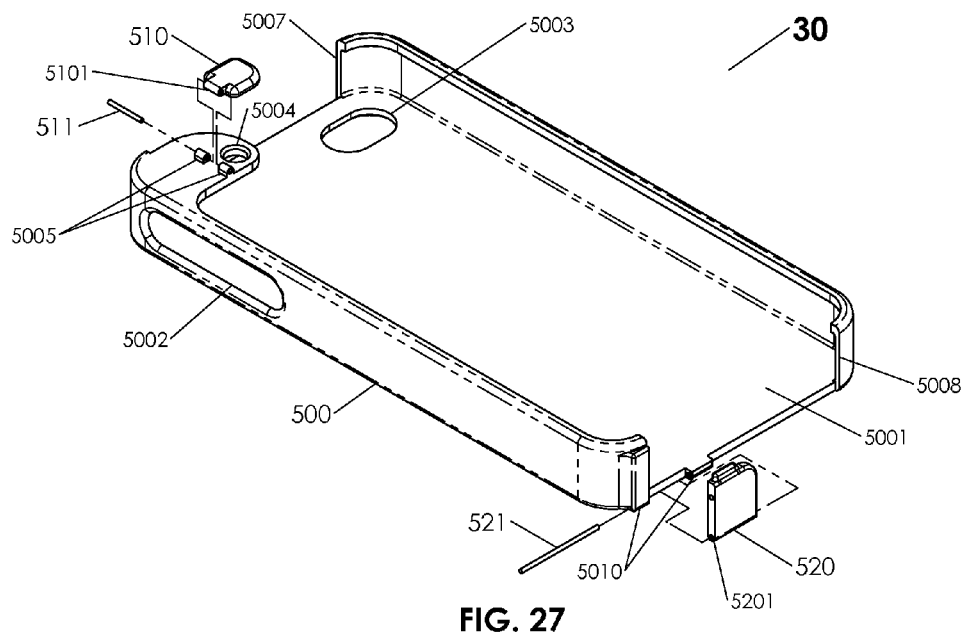
FIG. 27
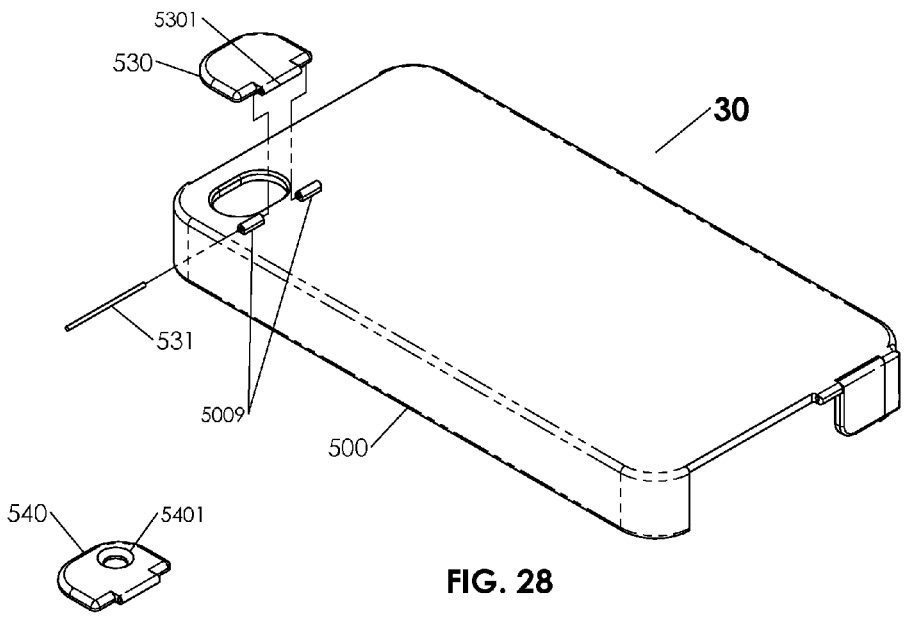
FIG. 28
FIG. 29

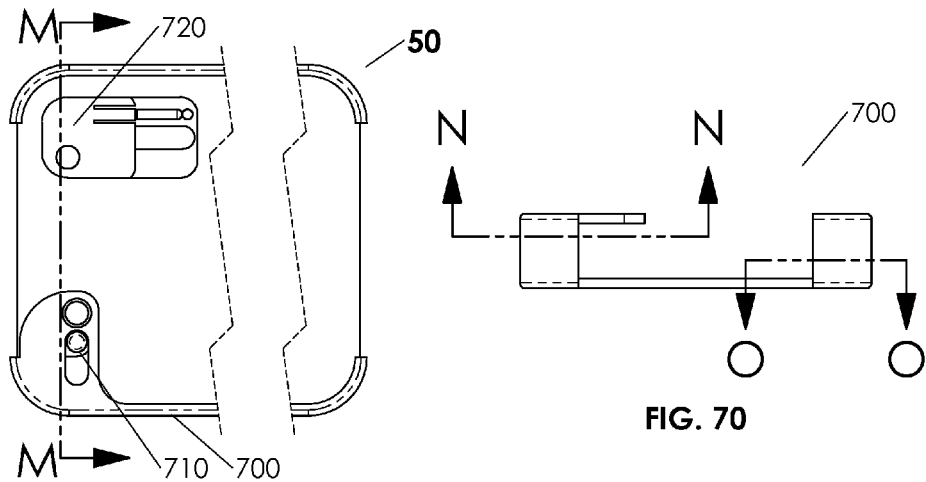
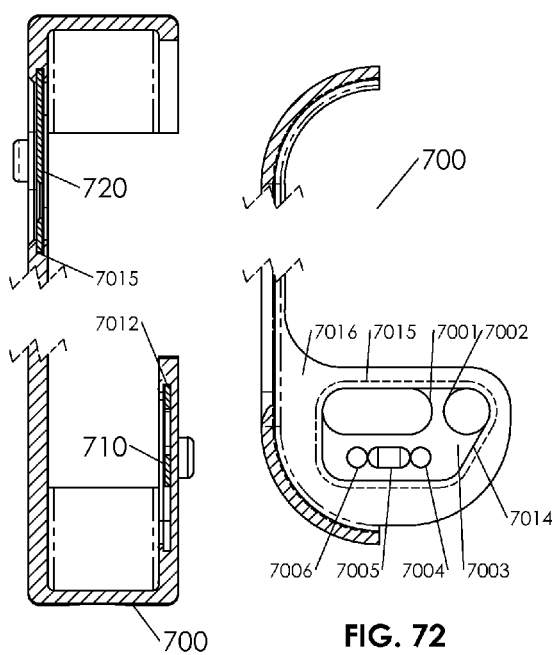
FIG. 69 FIG. 70 FIG. 71 FIG. 72 FIG. 73

PORTABLE ELECTRONIC DEVICE PRIVACY SYSTEM

TECHNICAL FIELD

Disclosed are devices, system and methods for preventing and/or hindering eavesdropping or accidental use of cameras, microphones or other sensors and/or information gathering components of a portable electronic device (PED) in order to obtain personal privacy.

BACKGROUND OF THE INVENTION

There has been an increased proliferation of personal electronic devices or PED's that are "camera and/or microphone enabled," which category includes devices such as digital cameras, mobile phones and portable computers (i.e., mini-computers, micro-computers, laptops and/or tablets). Because the PED can accidently record images, sound or video at unintended times, it would be desirable to provide a means of preventing such accidental use. Another concern is the opportunity for third-parties to use remote access to such devices and components (i.e., using a variety of communications methods via the internet, Wi-Fi, Bluetooth, infra-red or IR, wired connections, etc.) in a manner unauthorized by the owner and/or possessor of the device, such as making intentional recording of images, sound or video by those other than the user of the device, which can be referred to as eavesdropping, hacking or spying.

SUMMARY OF THE INVENTION

One aspect of the invention is to provide a removable cover that can provided a variety of functions for the device, which in some embodiments could including protecting the device from impact damage and/or contact damage to individual sensors. In various preferred embodiments, when the cover is placed onto and/or around the device, the cover could selectively impede and/or not significantly impede one of more features normally employed by the user of the device, which could include a variety of user functions such as: talking on the PED when it is a cellular phone, turning the PED on or off, listening to sound, adjusting volume, access to accessory slots, access to charging connections, access to computer interface connections, access to proximity sensors (which may be included on cell phones that turn off the screen when the phone is placed next to one's ear while communicating), access to automatic light sensors (which can dim or brighten the screen in response to the intensity of the ambient light) and not blocking the normal viewing of the screen. If desired, embodiments of the cover could include one or more removable and/or manipulable components and/or features that could selectively block and/or impede (as well as unblock and/or not impede) various functional features of the device.

Another aspect of the invention is to provide a variety of similar blocking/unblocking features as stated above, but in such a manner such that the feature can be slid, opened, clicked, unclicked, rendered clear and/or opaque, closed, removed, replaced and/or repositioned to another position on the device and/or cover, or even completely removed from the device, if desired.

An additional aspect of the invention is to incorporate various methods of inhibiting, reducing and/or preventing a third-party from utilizing one or more component features of the device to eavesdrop, hack, monitor and/or spy upon an individual, group of individuals and/or locations using a PED, by utilizing a case that the PED is placed in to and/or utilizing one or more features attached to the PED.

These and other objects, advantages, and features of the disclosure will be apparent from the following description, considered along with the accompanying drawings.

BRIEF DESCRIPTION OF THE DRAWINGS

The present invention will be more understood in the detailed description and the accompanying drawings.

FIG. 27 depicts an exploded front perspective view of the embodiment of FIG. 23;

FIG. 28 depicts an exploded rear perspective view of the embodiment of FIG. 24;

FIG. 29 depicts a rear perspective view of the rear camera cover embodiment of FIG. 28;

FIG. 69 depicts a top broken view of the linear sliding shutter embodiment of FIG. 61, with the mobile phone removed;

FIG. 70 depicts an end view of the case of FIG. 61;

FIG. 71 is a broken sectional View M-M of FIG. 69;

FIG. 72 depicts a partial broken sectional View N-N of the case of FIG. 70;

FIG. 73 depicts a partial broken sectional View O-O of the case of FIG. 70;

DETAILED DESCRIPTION OF THE DRAWINGS

In the following detailed description, for purposes of explanation, numerous specific details are set forth to provide a thorough understanding of the various embodiments of the disclosure. Those of ordinary skill in the art will realize that these various embodiments are illustrative only and are not intended to be limiting in any way. In addition, for clarity purposes, not all of the routine features of the embodiments described herein may be shown or described for every alternative embodiment. One of ordinary skill in the art would readily appreciate that in the development of any such actual implementation, numerous implementation-specific decisions may be required to achieve specific design objectives. These design objectives may vary from one implementation to another and from one developer to another, and the variations thereof are contemplated and included in the present disclosure.

Function

The various embodiments of the privacy system in this disclosure provide for preventing or hindering unwarranted use of the camera(s) and/or microphones (or other installed features) and can be customized for use with a variety of portable electronic devices ("PEDs"). Such PEDs may include mobile phones, video recorders, cameras, computers such as laptops and/or tablets, and any combinations thereof. The design also desirably allows full use of the PED with minimal interference when attached. In various embodiments, the slim compact design of the invention can be maintained even when a case is not attached to a phone (see FIG. 1).

Components

Figure 1:
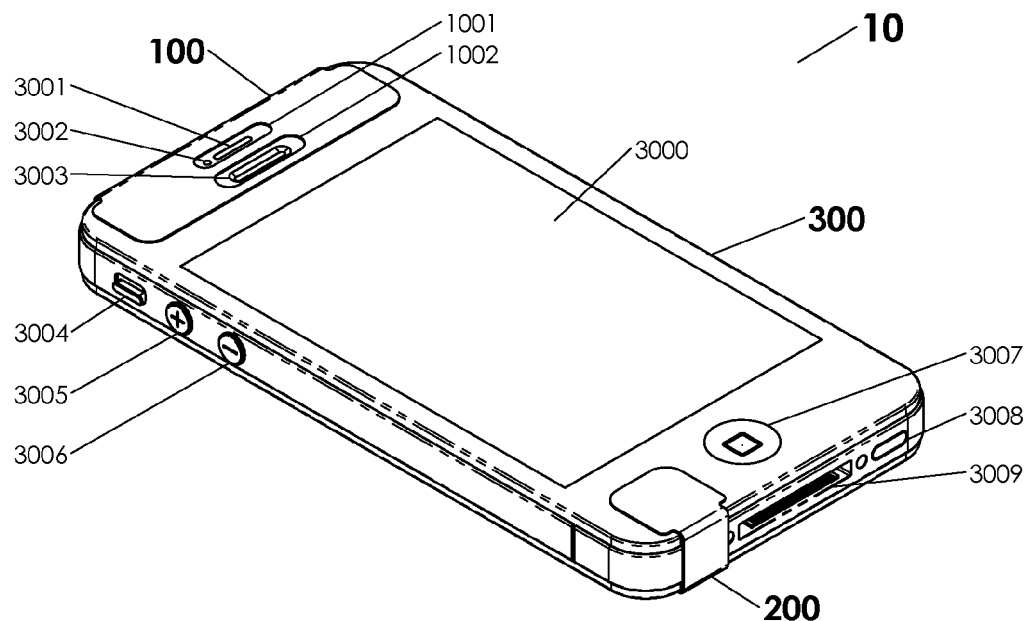
FIG. 1 depicts a front perspective view of one removable embodiment of the invention when attached to a mobile phone.
Figure 23:
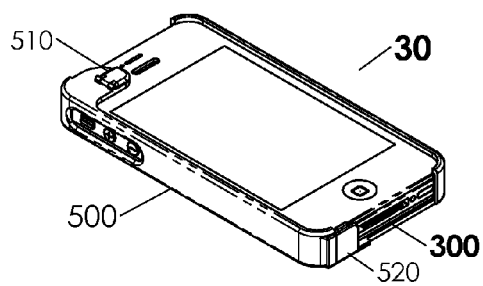
FIG. 23 depicts a front perspective view of an additional embodiment of the invention in the hinged privacy position when attached to a case of a mobile phone.
Figure 24:
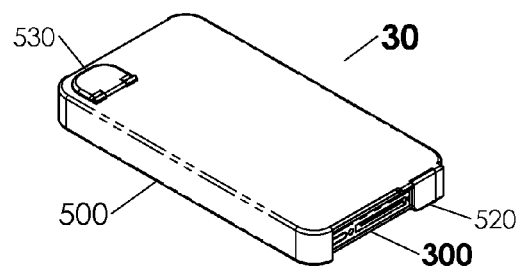
FIG. 24 depicts a rear perspective view of the embodiment of FIG. 23.

In various exemplary embodiments the privacy system may include a base assembly, or case with one or more features that can be utilized to physically and/or optically block a camera lens or physically and/or aurally block a microphone, a portable electronic device (PED) case, and a PED. FIG. 1 is a front perspective of the privacy system 10 that only includes the PED, one blocking device and associated methods for securing the front and rear cameras and one embodiment that blocks the microphone, while FIGS. 23-24 depict another embodiment of the privacy system 30 with a similar PED as FIG. 1 but within a case, and the case has separate features and associated methods for blocking one or more of the camera lenses and microphone. Another exemplary embodiment of the invention is the privacy system 32 shown in FIGS. 34-35, where no case may be used, but the various embodiment features can be directly attached to the surface or other portion of the PED without the use of an added case.

Those of ordinary skill in the art should realize that the various embodiments described herein are illustrative only, are not intended to be limiting in any way and can be combined and subtracted to fit the specific needs of various designs of PEDs. One exemplary PED described in this disclosure is an iPhone 4 or 4s (commercially available from Apple Corporation of Cupertino, Calif., USA) and this device is used for simplifying the disclosure, although a variety of other commercially available PED's could be used with the devices and methods taught herein. Depending on the layout of the PED, instead of two components 100 and 200, as shown in (FIG. 1), one of ordinary skill in the art could combine various multiple components into a single component, or potentially separate them into two, three or more features.

Desirably, the overall dimensions and/or thickness or width of the base (as well as the remaining components of the privacy system) can be customized or particularized to an individual unit, model and/or class of specific portable electronic devices (PEDs) intended to be used, which could include virtually any device currently available on the market including, for example, cellular or mobile phones (i.e., Samsung phones, iPhones, Windows phones and/or Blackberry phones), compact cameras, video recorders, laptops and/or tablet computers, etc. Alternatively, the base and other components may be sized and configured according to standard sizes that reflect the average dimensions of a given PED or class of PEDs, and these sizes may include small, medium, large, or x-large base sizes. In general, the width of the privacy system should desirably not exceed the width of the PED and/or case it supports, although various other ratios, such as less than twice the width of the PED/case, less than half the width of the PED/case, less than one quarter of the width of the PED/case and/or less than one fifth of the width of the PED/case may be desired.

FIG. 1 depicts a front perspective view of one exemplary embodiment of the privacy system 10 with removable embodiments 100 and 200 that can be utilized when attached to a mobile phone 300. The use of the invention will desirably allow full use of the PED/mobile phone functions such as the screen 3000, proximity sensor 3001, automatic light sensor 3002, receiver 3003, mute switch 3004, up volume button 3005, down volume button 3006, home button 3007, speaker 3008, computer/power access port 3009, (see FIG. 2 for remaining functions) on/off switch 3011, light 3012, SIM card access port 3013 and audio jack 3014, although various degraded levels of one or more of these functions might be acceptable to the user, and thus "less than full use" of one or more of these functions is contemplated within the teachings of the various embodiments described herein. Also depicted in FIG. 1 is the camera blocker 100 which has slots 1001 and 1002 which desirably allow the various PED functions 3001-3003 to operate normally. These features, and other embodiments of the invention, can vary in length, width, thickness and opening sizes to accommodate various PEDs. Also depicted in FIG. 1 is the microphone blocker 200 which is shown covering the microphone 3015 (see FIG. 3). The blockers 100 and 200 can be made from thin metal, plastic or other material with like characteristics and are designed to squeeze onto the PED. The thin profiles of the blockers desirably allow them to be easily pocketable without protrusions that could cause an accidental dislodging of the blockers from the PED. For storage the blockers can be moved to another area of the PED or to another location.

Figure 2:
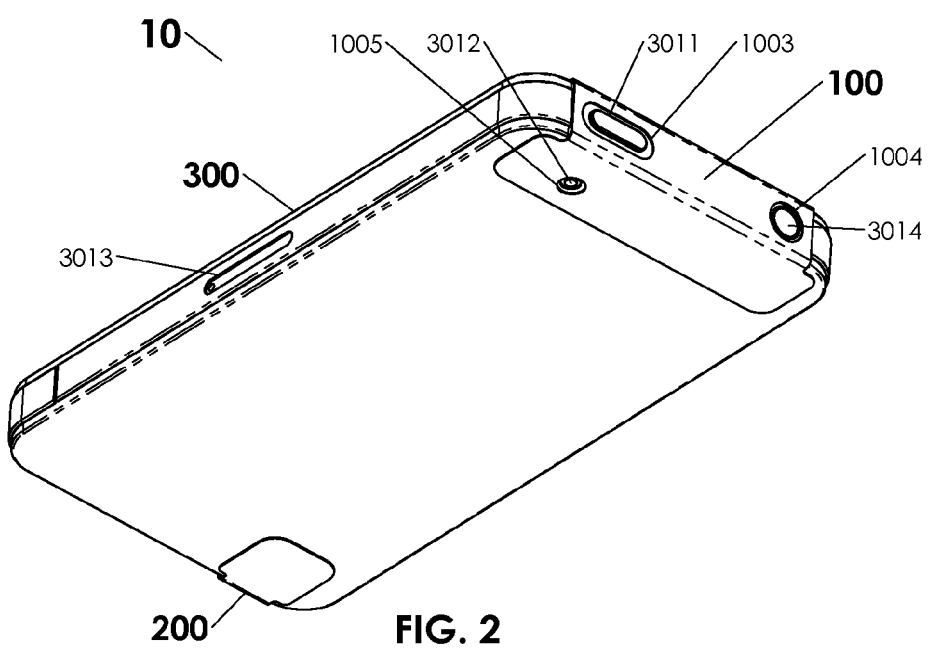
FIG. 2 depicts a rear perspective view of the embodiment of FIG. 1.

FIG. 2 depicts a rear perspective view of the privacy system 10 with removable embodiments 100 and 200 when attached to a mobile phone 300. Also depicted in FIG. 2 is the camera blocker 100 which includes a hole 1005 which allows the functions of the PED light 3012 to operate normally. Also depicted in FIG. 2 is the microphone blocker 200 which is shown covering the microphone 3015 (see FIG. 3).

Figure 3:
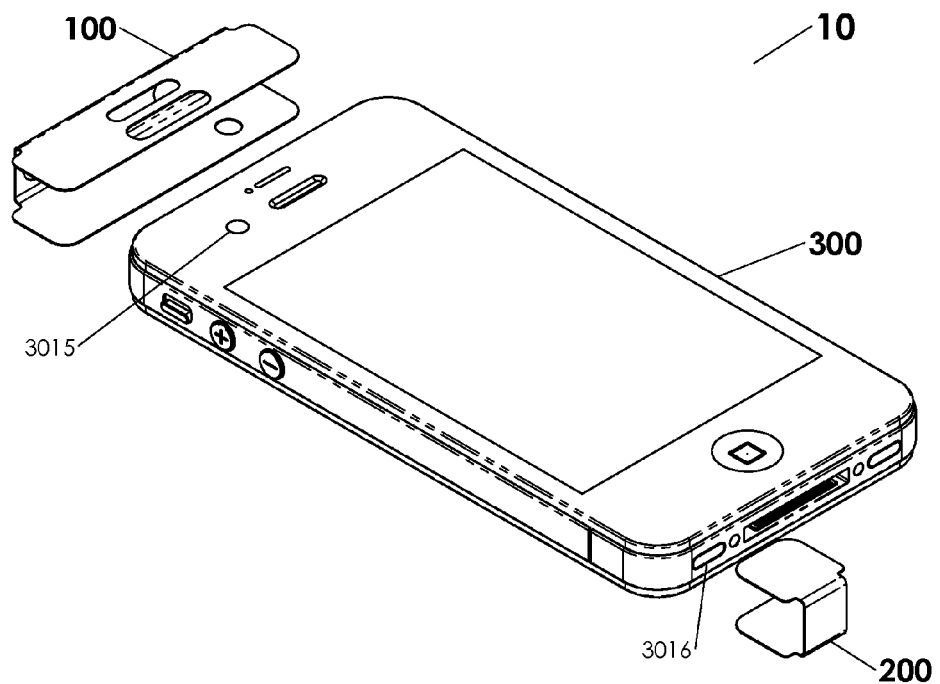
FIG. 3 depicts a front perspective exploded view of the embodiment of FIG. 1.

FIG. 3 depicts an exploded front perspective view of the embodiment of FIG. 1 which reveals the front camera lens 3015 of the PED and microphone 3016 which is normally blocked by the camera blocker 100 and microphone blocker 200.

Figure 4:
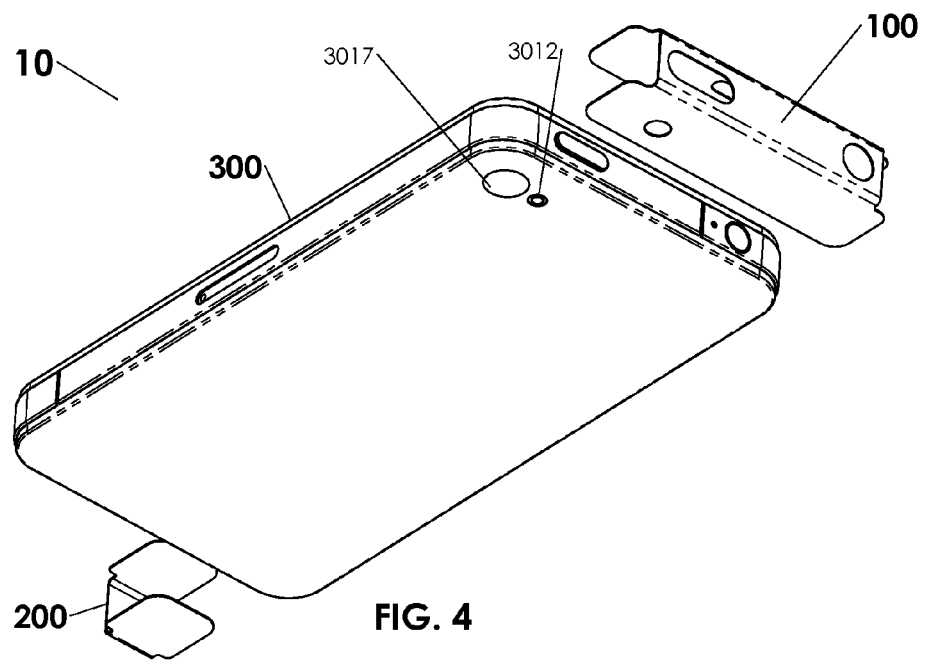
FIG. 4 depicts a rear perspective exploded state of the rear perspective view of FIG. 1.

FIG. 4 depicts an exploded rear perspective view of the embodiment of FIG. 2 which reveals the rear camera lens 3017 of the PED and microphone 3016 which is normally blocked by the camera blocker 100 and microphone blocker 200.

Figure 5:
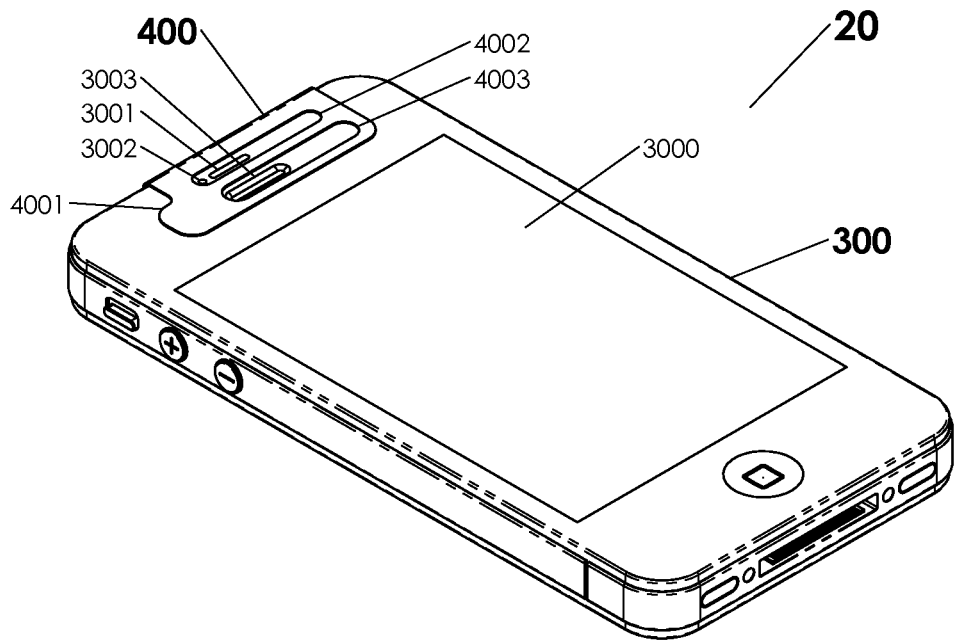
FIG. 5 depicts a front perspective view of another embodiment of a privacy closure, in the privacy position, when attached to a mobile phone.
Figure 6:
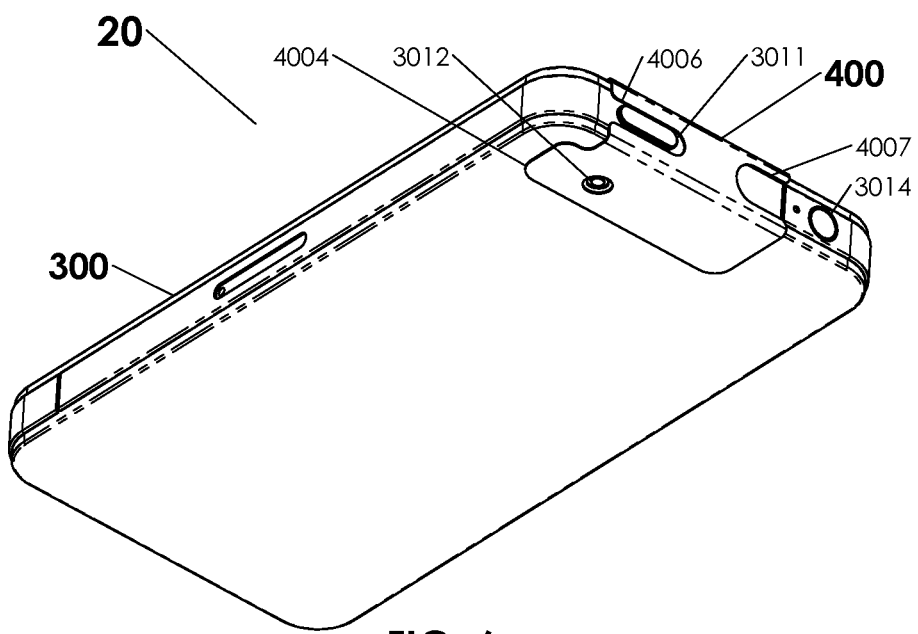
FIG. 6 depicts a rear perspective view of the embodiment of FIG. 5.

FIGS. 5 and 6 depict front and rear perspective views of a sliding camera blocker embodiment of the invention, in the privacy position, when attached to a mobile phone. This embodiment 20 desirably keeps the blocker 400 in the same general location on the PED/mobile phone and employs a slight shift in position to allow use of the camera as shown in FIGS. 7 and 8.

Similar to the previous embodiment, this embodiment 20 also desirably allows the PED functions such as the screen 3000, proximity sensor 3001, automatic light sensor 3002, receiver 3003, (see FIG. 6 for remaining functions) on/off switch 3011, light 3012 and audio jack 3014. The access to the functions listed above is possible through the elongated oval shaped slots 4002 and 4003 in FIG. 5 and the elongated open-ended slots 4006 and 4007 shown in FIG. 6. To one skilled in the art it should be understood that the slots do not necessarily need to be closed, open-ended, oval or square, as long as the slots desirably perform the intended function of physically and/or optically covering or "blocking" the camera lenses when in the private position, and exposing the cameras when the blocker 400 is moved to the in-use or unblocked position. In various embodiments, one or more portions of the blocker may include colored and/or textured features, desirably allowing the user to employ their visual and/or tactile senses to verify the position of the blocker, such as a red color on one side of the blocker and a green color on an opposing side of the blocker (i.e., red could signify a blocked condition, and green could signify an unblocked condition). The tactile features could desirably allow user verification in no-light or low-light conditions.

Figure 7:
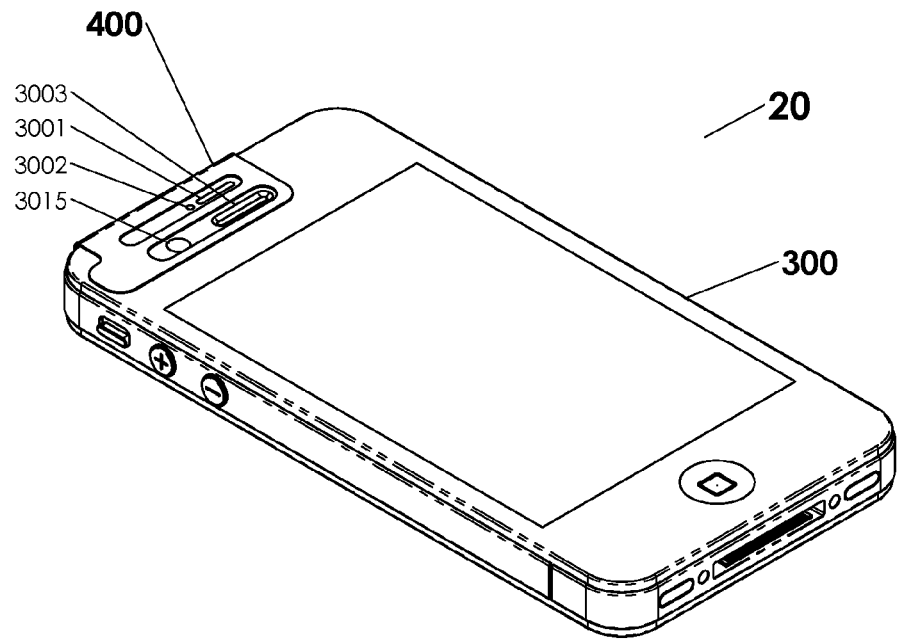
FIG. 7 depicts a front perspective view of the embodiment of FIG. 5, in the non-privacy position, when attached to a mobile phone.
Figure 8:
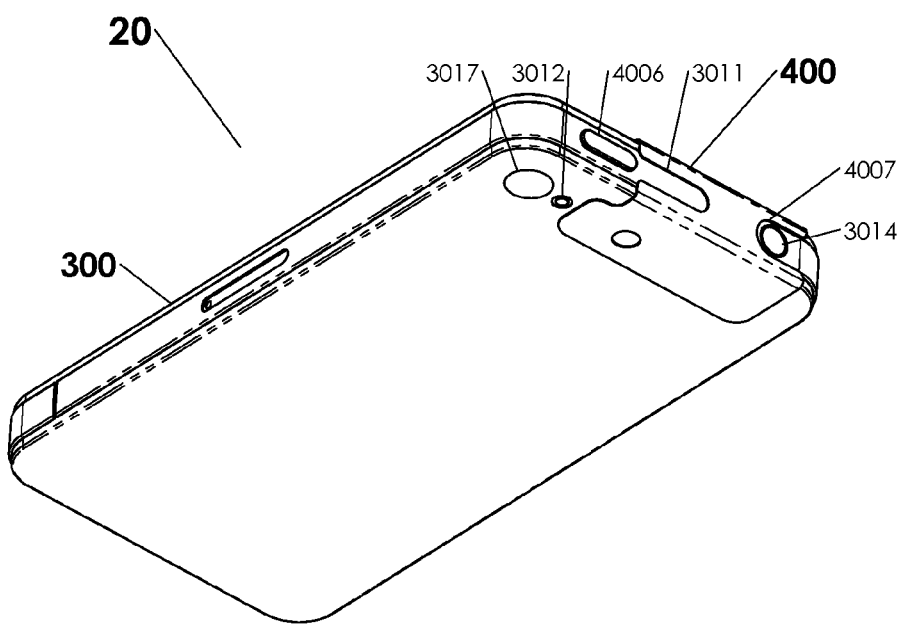
FIG. 8 depicts a rear perspective view of the embodiment of FIG. 7.
Figure 9:
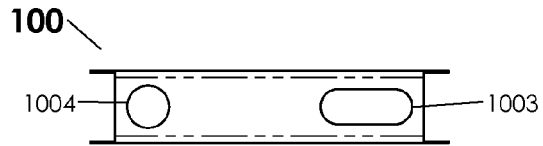
FIGS. 9-13 depict planar and perspective views of a camera blocker embodiment of FIG. 1 from various orientations.
Figure 10:
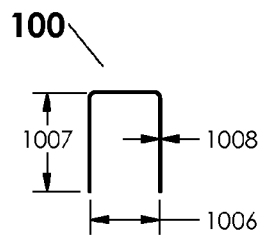
Figure 11:
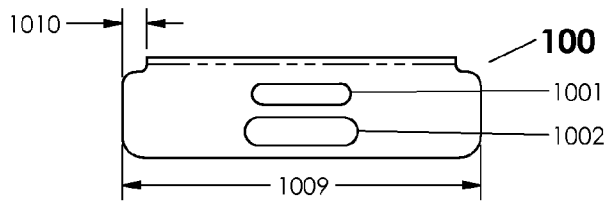
Figure 12:
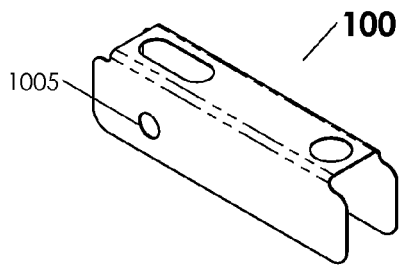
Figure 13:
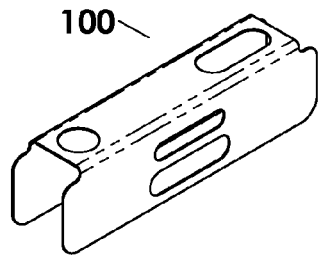
Figure 14:
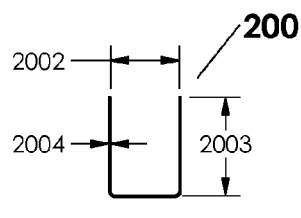
FIGS. 14-17 depict planar and perspective views of a microphone blocker embodiment of FIG. 1 from various orientations.
Figure 15:
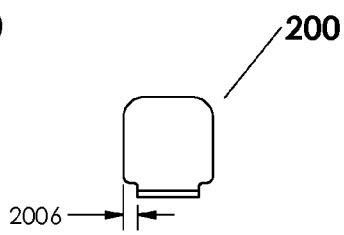
Figure 16:
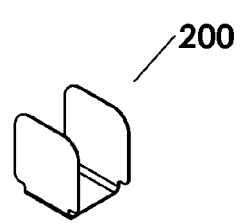
Figure 17:
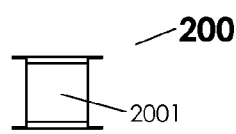
Figure 18:
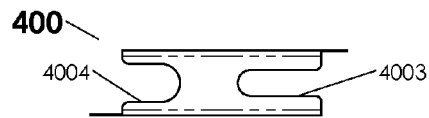
FIGS. 18-22 depict planar and perspective views of another embodiment of the camera blocker of FIG. 5, from various orientations.
Figure 19:
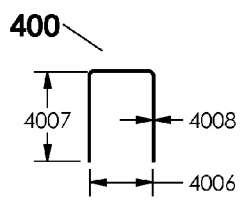
Figure 20:
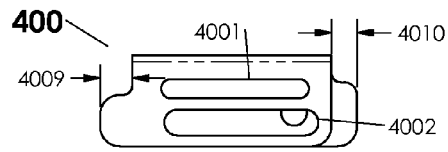
Figure 21:
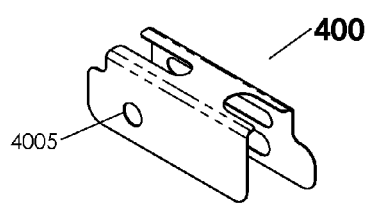
Figure 22:
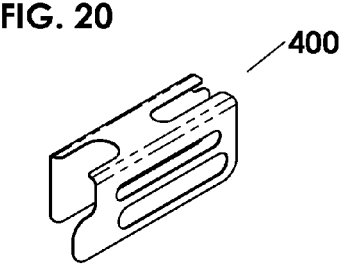

FIGS. 7 and 8 depict front and rear perspective views of a sliding camera blocker embodiment of the invention, in the in-use or unblocked position, when attached to a mobile phone. As mentioned earlier, this embodiment 20 desirably keeps the blocker 400 in the same general location on the PED/mobile phone and uses a slight shift in position to block the camera as shown in FIGS. 5 and 6. When in the in-use or unblocked position, this embodiment 20 desirably also allows uninhibited access to and/or use of the PED functions such as the screen 3000, proximity sensor 3001, automatic light sensor 3002, receiver 3003, (see FIG. 6 for remaining functions) on/off switch 3011, light 3012 and headphone jack 3014. The access to the functions listed above is possible through the elongated oval shaped slots 4002 and 4003 in FIG. 5 and the elongated open-ended slots 4006 and 4007 shown in FIG. 6, but in this embodiment the user now has access to both front and rear cameras, which can both be blocked and/or unblocked (i.e., simultaneously) via manipulation of a single blocker, if desired. If desired, the design of an individual blocker could include features allowing for use of one or more PED functions (i.e., unimpeded access to the microphone jack) with the blocker in each of the blocked and unblocked positions (i.e., when the camera is either the blocked or unblocked conditions, the microphone jack is freely accessible through an elongated or other shaped opening). All manner of various combinations of such access and blocked conditions for each of the enumerated PED functions are contemplated by the present disclosure.

FIGS. 9-13 depict planar and perspective views of the camera blocker 100 of FIG. 1 from various orientations. The following features of this embodiment desirably allow use of the PED's normal features while blocking the PED camera(s): sensor opening 1001, receiver opening 1002, switch opening 1003, audio opening 1004 and light opening 1005. The thickness 1008 of the blocker 100 is preferably sufficient to allow flexibility of the component while providing sufficient compression on the PED to maintain the blocker in a desired position, while the height 1007 and width 1006 can be adjusted to fit the variety of forms a PED may come in. To one of ordinary skill in the art it should be understood that the openings do not necessarily need to be closed, open-ended, oval or square, as long as they perform the intended function of covering the camera lens(es) when in the private position and expose the camera(s) when the camera blocker 100 is removed. As stated earlier, it should also be understood that the blocker does not necessarily have to have perpendicular walls as shown in the figures, but may include angles or radiuses of varying shapes and/or sizes in order to fit the form of the PED.

FIGS. 14-17 depict planar and perspective views of one embodiment of the microphone blocker 200 of FIG. 1 from various orientations. The shape of the microphone blocker desirably allows the use of the PED's normal features while blocking the PED's microphone 3016 to varying extents. The thickness 2004 of the blocker 200 in this embodiment is desirably sufficient to allow the component to maintain its flexibility while providing sufficient compression on the PED to maintain the device in a desired position, while the height 2003 and width 2002 can be adjusted to fit the variety of forms a PED may come in. As stated previously, the shape of the microphone blocker can vary according to the form of the PED. If desired, the microphone blocker can include sound-deadening and/or sealing features, including being formed from sound-absorbing materials, the use of silicone and/or other type seals.

FIGS. 18-22 depict planar and perspective views of another exemplary embodiment of a sliding camera blocker 400 of FIG. 5 from various orientations. The following features allow use of the PED's normal features while blocking the PED camera(s): sensor opening 4001, receiver opening 4002, switch opening 4003, audio opening 4004 and light opening 4005. The thickness 4008 of the sliding camera blocker 400 is desirably sufficient to allow component flexibility while providing sufficient compression on the PED, while the height 4007 and width 4006 can be adjusted to fit the variety of forms a PED may come in. As stated earlier, it should be understood that the blocker does not necessarily have to have perpendicular walls as shown in the figures, but may include angles or radiuses in order to fit the form of the PED.

FIG. 23 depicts a front perspective view of another additional embodiment 30 of the invention, with various blocking features shown in the hinged blocking, or closed position, when attached to a case 500 of a mobile phone 300. The blocking of the front camera 3015 (see FIG. 7) is desirably accomplished when the front camera blocking door 510 is in the closed or blocking position, thus covering the front camera 3015 but still allowing the other normal functions of the PED as referenced in other embodiments of this invention. Also shown in this figure is the microphone blocking door 520 in the hinged blocking or closed position. To one skilled in the art it should be understood that the hinged doors do not necessarily need to be shaped precisely as depicted in the various figures, as long as these features perform the intended function of covering and/or optically blocking the camera lens when in the private blocking or closed position, and exposing the camera when the front camera blocking door 510 is opened. A similar reasoning can be applied to the microphone blocking door 520 and rear camera blocking door 530 (see FIG. 24), if desired. Also shown in this figure is the microphone blocking door 520 in the hinged blocking or closed position.

FIG. 24 depicts a rear perspective view of the embodiment 30 from FIG. 23 in the hinged blocking, or closed position, when attached to a case 500 of a mobile phone 300. The blocking of the rear camera 3017 (see FIG. 8) in this embodiment can be accomplished when the rear camera blocking door 530 is in the closed or blocking position, thus covering the rear camera 3017. Another exemplary embodiment of the rear camera blocking door 540 (see FIG. 29) can allow the normal function of the PED light 3012 (see FIG. 8). In this embodiment, the front and rear camera doors can be operated independently, thereby allowing the user to operate one camera while maintain the other camera door in a closed position, if desired. Also shown in this figure is the microphone blocking door 520 in the hinged blocking or closed position.

Figure 25:
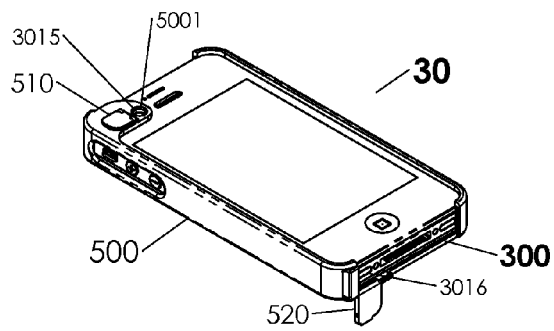
FIG. 25 depicts a front perspective view of an additional embodiment of the invention in the hinged non-privacy position when attached to a case of a mobile phone.

FIG. 25 depicts a front perspective view of the embodiment 30 of the invention in the hinged non-privacy position when attached to a case 500 of a mobile phone. The un-blocking of the front camera 3015 (see FIG. 7) can be accomplished when the front camera blocking door 510 is in the opened or un-blocking position, thus revealing the front camera 3015, but still allowing the other normal functions of the PED as referenced in other embodiments of this invention. Also shown in this figure is the microphone blocking door 520 in the hinged non-privacy position.

Figure 26:
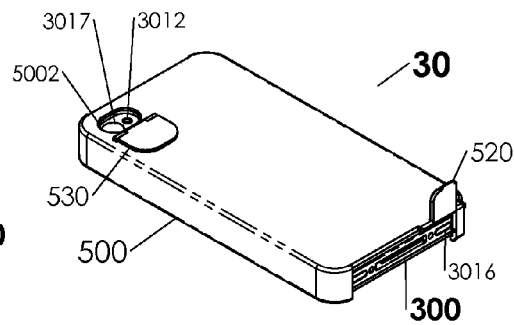
FIG. 26 depicts a rear perspective view of the embodiment of FIG. 25.

FIG. 26 depicts a rear perspective view of the embodiment 30 of FIG. 25 in the hinged un-blocking, or opened position, when attached to a case 500 of a mobile phone 300. The un-blocking of the rear camera 3017 (see FIG. 8) can be accomplished when the rear camera blocking door 530 is in the open or un-blocking position, thus revealing the rear camera 3017 and light 3012. Also shown in this figure is the microphone blocking door 520 in the hinged un-blocking or opened position.

FIGS. 27 and 28 depict exploded front and rear perspective views of the embodiment 30, showing exemplary methods of attaching the front camera blocker 510 to the case 500 through male hinge feature 5101 and female hinge feature 5005, which can be connected via a shaft 511 or other connection feature known in the art. Similarly, microphone blocker 520 can be attached to the case 500 through male hinge feature 5201 and female hinge feature 5010, which are connected via a shaft 521 or other connection feature known in the art. Also, rear camera blocker 530 is depicted attached to the case 500 through male hinge feature 5301 and female hinge feature 5009, which are connected via a shaft 531 or other connection feature known in the art. Those familiar in the art should understand that a shaft (511-513) is only one exemplary way of showing a revolving or rotating connection feature of the invention, and the invention should not be limited to a shaft only, but could include a variety of closing arrangements, including a snap male/female spherical surface feature, similar to those found in many products on the market today, or other types of rotating members. To hold the blockers in the positions mentioned earlier, the connection features may incorporate friction fits between the revolving members or snap features that hold the blockers in the open and/or closed positions, as well as spring-loaded features to bias one or more of the blockers into the open and/or closed position, as desired.

Also shown in FIGS. 27 and 28 are PED function access openings 5002, 5003, 5004, 5007 and 5008 in the case 500, which desirably allow access to various functional features of the PED. If desired, one or more blocker doors or similar features could be provided to allow the use or selectively allow access to such functional features, and/or to impeded and/or disable the various functions with the blocker doors closed.

FIG. 29 depicts a rear perspective view of another additional embodiment 540 of a rear camera cover 530 of FIG. 28. In this embodiment, a conically shaped opening 5401 on the blocker door facilitates the use of the PED light with the door in the closed and blocked position.

Figure 30:
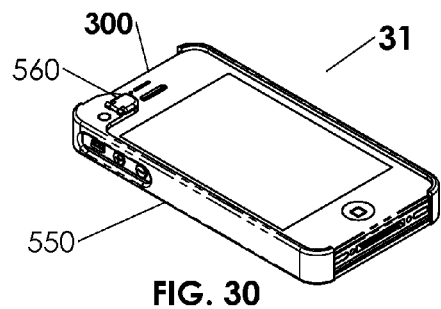
FIG. 30 depicts a front perspective view of an alternative embodiment of the invention, in the hinged privacy position using magnets when attached to a case of a mobile phone.
Figure 31:
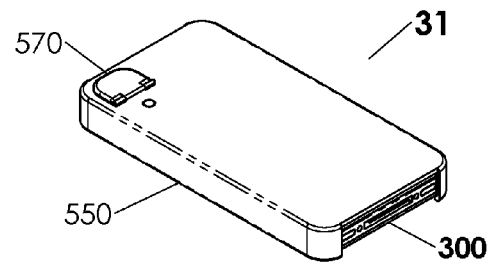
FIG. 31 depicts a rear perspective view of the additional embodiment of FIG. 30.

FIGS. 30 and 31 depict front and rear perspective views of an additional embodiment 31 of the invention with blocking door in the hinged blocking, or closed position, when attached to a case 550 of a mobile phone 300, where the blockers 560 and 570 are held in one or more desired positions (which could include one or both of the open and/or closed positions) using magnets.

Figure 32:
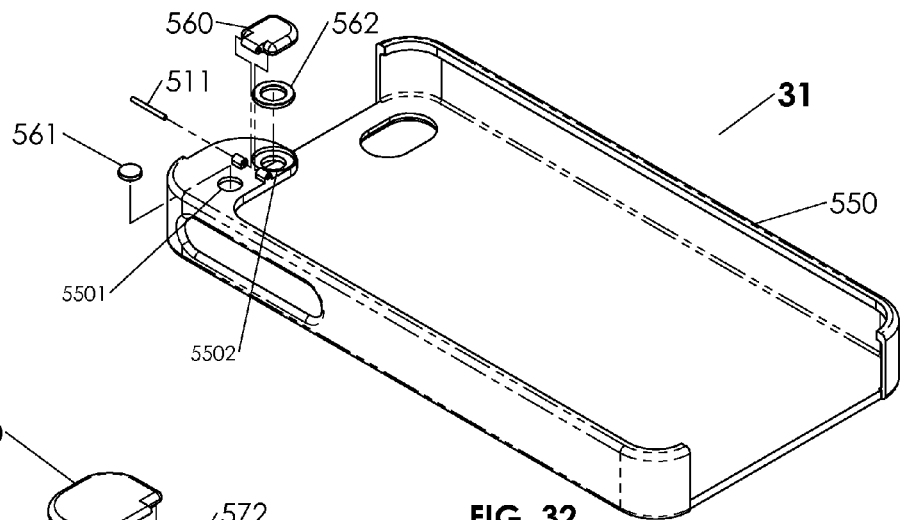
FIG. 32 depicts an exploded front perspective view of the embodiment of FIG. 30.
Figure 33:
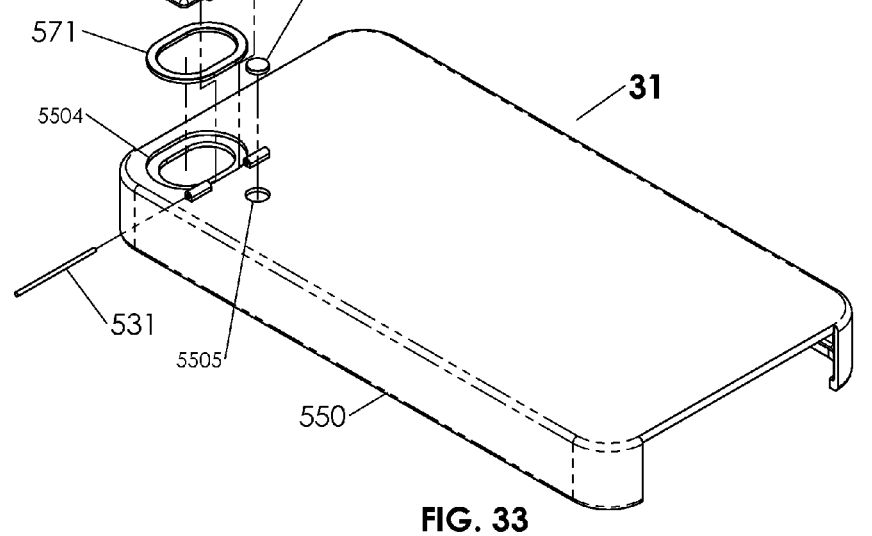
FIG. 33 depicts an exploded rear perspective view of the embodiment of FIG. 31.

FIGS. 32 and 33 depict exploded front and rear perspective views of the embodiment 31, showing the front camera blocker 560 and rear camera blocker 570, which can comprise a ferrous metal material, with the doors held in the open position by magnets 561 and 572 or in the closed or blocking position by magnets 562 and 571. To one skilled in the art it should be understood that the shape of the magnets shown in these figures is for illustrative purpose only and could vary from PED to PED.

Figure 34:
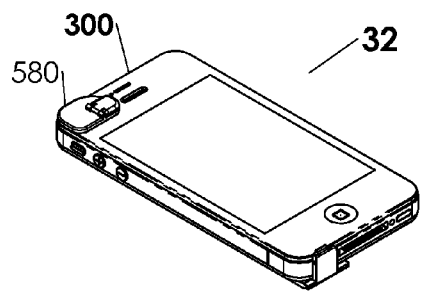
FIG. 34 depicts a front perspective view of another alternative embodiment of the invention, in the privacy position when attached directly to a mobile phone.
Figure 35:
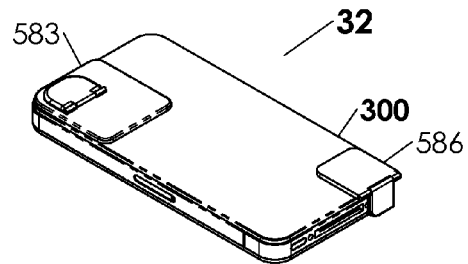
FIG. 35 depicts a rear perspective view of the embodiment of FIG. 34.

FIGS. 34 and 35 depict front and rear perspective views of an additional hinged embodiment 32 of the invention in the privacy position, where the front camera blocker base 580, rear camera blocker base 583 and microphone blocker base 586 can be attached directly to a mobile phone or PED.

Figure 36:
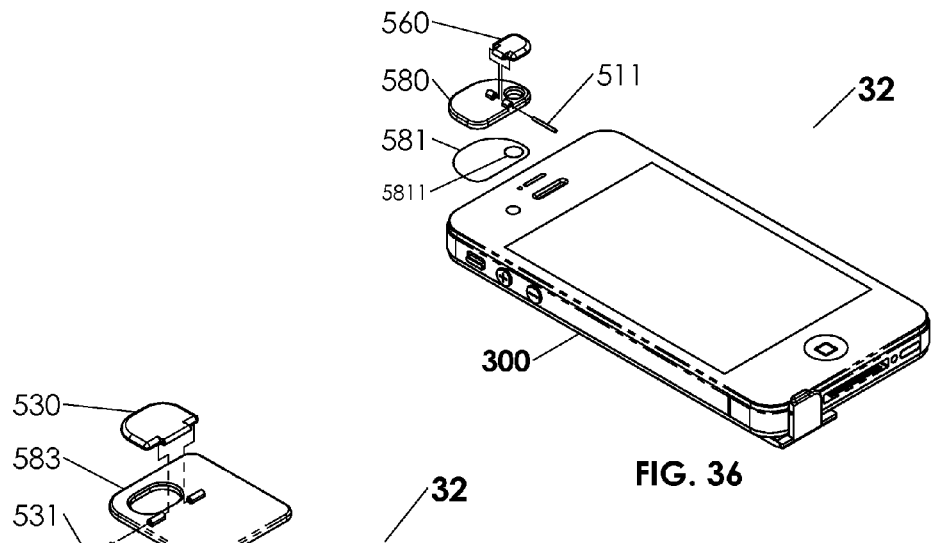
FIG. 36 depicts an exploded front perspective view of the embodiment of FIG. 34.
Figure 37:
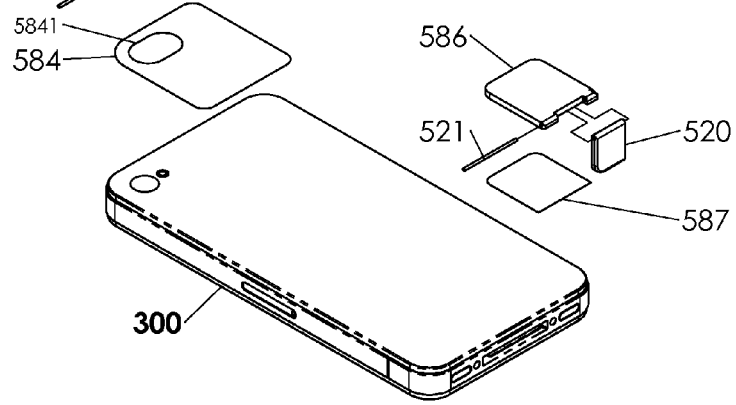
FIG. 37 depicts an exploded rear perspective view of the embodiment of FIG. 35.

FIGS. 36 and 37 depict an exploded front and rear perspective views of the embodiment 32, where the front camera blocker base 580 is attached to the mobile phone 300 via an adhesive 581 or other connecting means, the rear camera blocker base 583 is attached to the mobile phone 300 via an adhesive 584 or other connecting means and the microphone blocker base 586 is attached to the mobile phone 300 via an adhesive 587 or other connecting means.

Figure 38:
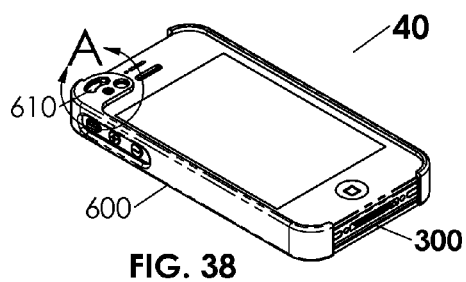
FIG. 38 depicts a front perspective view of an alternative embodiment, incorporating a revolving shutter, shown in the privacy position when attached to a case of a mobile phone.

FIG. 38 depicts a front perspective view of an additional embodiment 40 of the invention, featuring a front revolving blocker 610 in the privacy position when attached to a case 600 of a mobile phone 300. A partial view is defined by the circle A.

Figure 39:
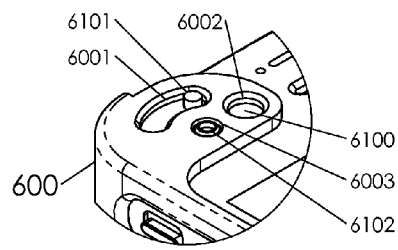
FIG. 39 is an enlarged partial view of the front perspective view of FIG. 38.

FIG. 39 is an enlarged partial view A of the front perspective view of FIG. 38, with detail depicting one example of how the front revolving blocker 610 could utilize surface 6100 to block the front camera lens 3015 of the PED, which in this embodiment is below the front camera opening 6002. This blocking function is possible when the post 6101 traverses to the end of the slot 6001 in a clockwise direction. The revolving blocker 610 can rotate around the post 6201 that is contained in hole 6003.

Figure 40:
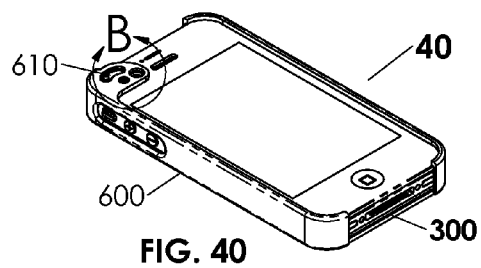
FIG. 40 depicts a front perspective view of an alternative embodiment, incorporating a revolving shutter, shown in the non-privacy position when attached to a case of a mobile phone.

FIG. 40 depicts a front perspective view of an additional embodiment 40 of the invention featuring a front revolving blocker 610 in the un-blocking, or opened, position when attached to a case 600 of a mobile phone 300. A partial view is defined by the circle B.

Figure 41:
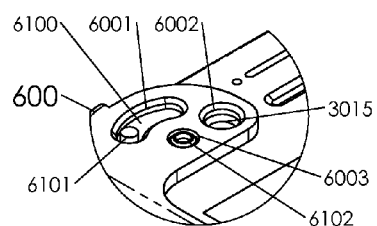
FIG. 41 is an enlarged partial view of the front perspective view of FIG. 40.

FIG. 41 is an enlarged partial view B of the front perspective view of FIG. 40 with detail depicting how the revolving blocker's 610 surface 6100 can be revolved counter-clockwise to un-block the front camera lens 3015 of the PED, which in this example is now usable through front camera opening 6002. This un-blocking function is possible when the post 6101 traverses to the end of the slot 6001 in a counter-clockwise clockwise direction.

Figure 42:
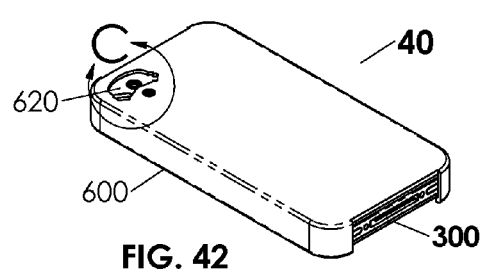
FIG. 42 depicts a rear perspective view of an additional revolving shutter embodiment 40 of the invention in the privacy position when attached to a case of a mobile phone.

FIG. 42 depicts a rear perspective view of an additional embodiment 40 of the invention, featuring a rear revolving blocker 620 in the privacy position when attached to a case 600 of a mobile phone 300. A partial view is defined by circle C.

Figure 43:
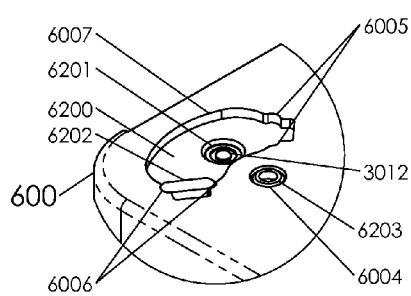
FIG. 43 is an enlarged partial view of the rear perspective view of FIG. 42.

FIG. 43 is an enlarged partial view C of the rear perspective view of FIG. 42, with detail depicting how the rear revolving blocker 620 can utilize surface 6200 to block the rear camera lens 3017 of the PED, which in the example shown is below the rear camera opening 6007. This blocking function is possible when the tab 6202 rotates into notches 6006 in a counter-clockwise direction. The revolving blocker 620 can rotate around the post 6203 that is contained in hole 6004. Also shown is how the light 3012 of the phone 300 can be usable, even when the camera lens 3017 is blocked by surface 6200 by the hole 6201 in the rear revolving blocker 620.

Figure 44:
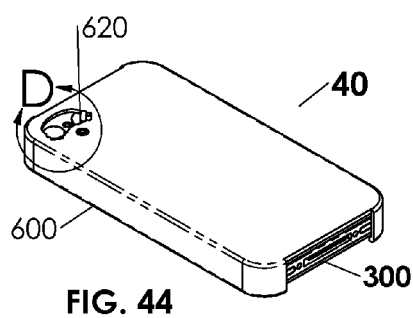
FIG. 44 depicts a rear perspective view of an additional revolving shutter embodiment 40 of the invention in the non-privacy position when attached to a case of a mobile phone.

FIG. 44 depicts a rear perspective view of an additional embodiment 40 of the invention, featuring a rear revolving blocker 620 in the un-blocking, or opened, position when attached to a case 600 of a mobile phone 300. A partial view is defined by the circle D.

Figure 45:
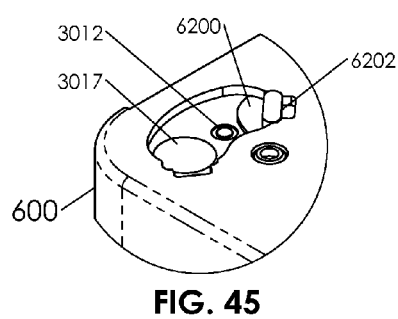
FIG. 45 is an enlarged partial view of the rear perspective view of FIG. 44.

FIG. 45 is an enlarged partial view D of the rear perspective view of FIG. 44, with detail depicting how the rear revolving blocker 620 can be revolved counter-clockwise to un-block the rear camera lens 3017 of the PED, which is visible in the rear camera opening 6007. This un-blocking function can be possible when the tab 6202 rotates into notches 6005 in a clockwise direction. The revolving blocker 620 rotates around the post 6203 that is contained in hole 6004. Also shown is how the light 3012 of the phone 300 can be usable when the camera lens 3017 is un-blocked by surface 6200.

Figure 46:
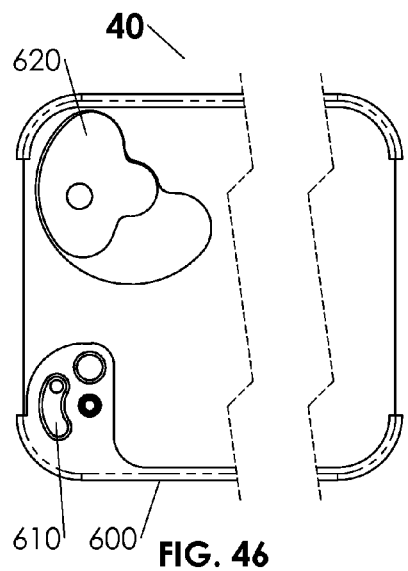
FIG. 46 depicts a top broken view of the revolving shutter embodiment of FIG. 38 with the mobile phone 300 removed, showing the front revolving blocker and rear revolving blocker on place in the case.

FIG. 46 depicts a top broken view of the revolving shutter embodiment 40 of FIG. 38, with the mobile phone removed, and showing the front revolving blocker 610 and rear revolving blocker 620 in a user-defined position.

Figure 47:
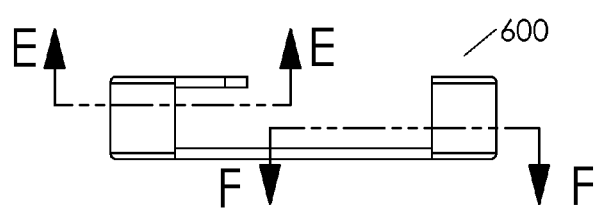
FIG. 47 depicts an end view of the case 600 of the revolving shutter embodiment of FIG. 38, and contains partial sections defined by lines E-E and F-F.

FIG. 47 depicts an end view of the Case 600 of FIG. 38.

Figure 48:
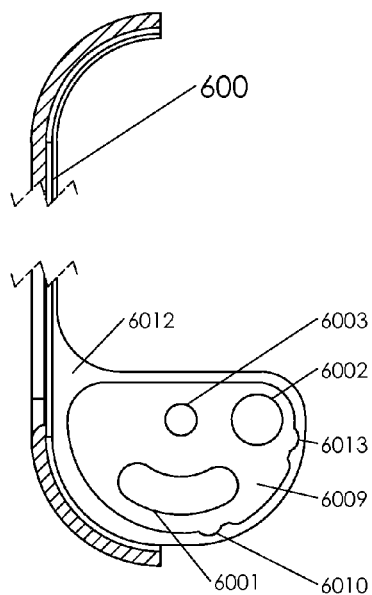
FIG. 48 depicts a partial broken sectional View E-E of the case 600 of FIG. 47.

FIG. 48 depicts a partial broken sectional View E-E of the Case 600 of FIG. 47, depicting the front cavity 6009 below planar surface 6012, which can contain the front revolving blocker 610 (not shown). The periphery of the front cavity 6009 can include two female contours 6010 and 6013. If desired, the contour 6013 can mate with the male detent 6103 of front revolving blocker 610 (see FIG. 51) when the front revolving blocker 610 is in the blocking position (see FIG. 39). Similarly, contour 6010 can mate with the male detent 6103 of front revolving blocker 610 (see FIG. 51) when the front revolving blocker 610 is in the un-blocking position (see FIG. 41).

Figure 49:
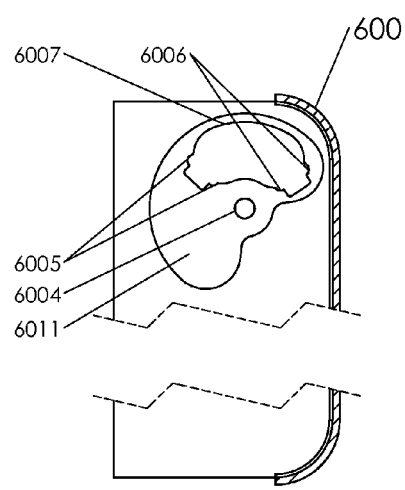
FIG. 49 depicts a partial broken sectional View F-F of the case 600 of FIG. 47.

FIG. 49 depicts a partial broken sectional View F-F of the Case 600 of FIG. 47, showing the rear cavity 6011 which contains the rear revolving blocker 620 (not shown). The periphery of the front cavity 6011 has two sets of female contours 6005 and 6006. Contours 6006 mate with the male contours of tab 6202 of rear revolving blocker 620 (see FIG. 54) when the front revolving blocker 620 is in the blocking position (see FIG. 43). Contours 6005 mate with the male contours of tab 6202 of rear revolving blocker 620 (see FIG. 51) when the rear revolving blocker 620 is in the un-blocking position (see FIG. 45).

Figure 50:
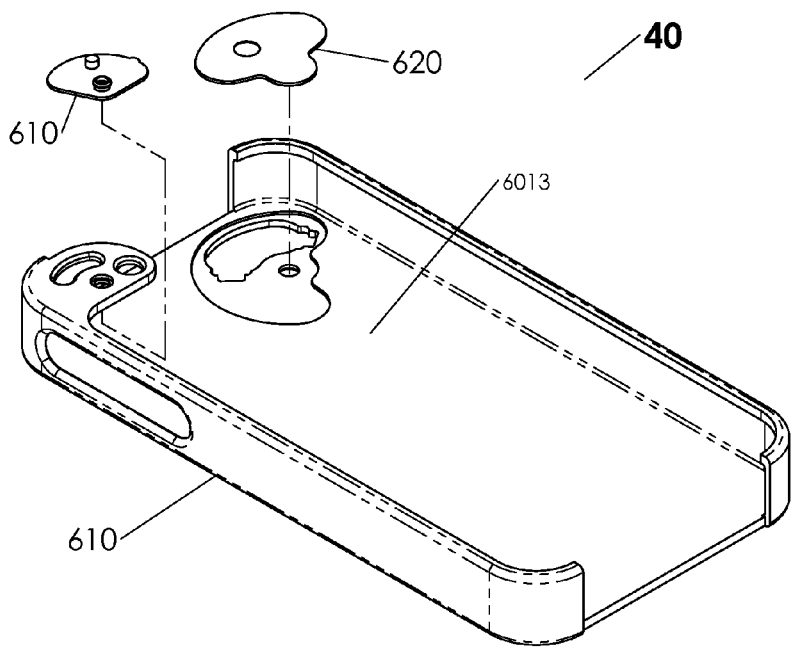
FIG. 50 depicts an exploded front perspective view of the embodiment of FIG. 38, with the mobile phone removed.

FIG. 50 depicts an exploded front perspective view of the revolving shutter embodiment of FIG. 38, with the mobile phone 300 removed, showing the front revolving blocker 610 and rear revolving blocker 620 on place in the case 600.

Figure 51:
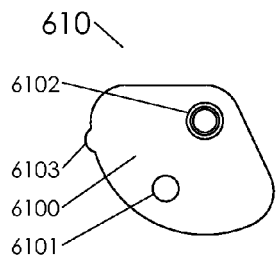
FIGS. 51-53 depict planar views of the front revolving camera blocker of FIG. 50, from various orientations.
Figure 52:
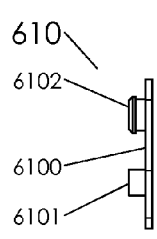
Figure 53:
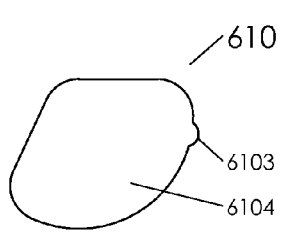

FIGS. 51-53 depict planar views of the front revolving camera blocker 610 of FIG. 50 from various orientations. In this embodiment, planar surface 6100 blocks the front lens 3012, while the hole 6101 allows the front lens 3015 to operate normally. The front revolving camera blocker 610 revolves around post 6102 that is captured in hole 6003 of the case 600. Also shown is the male detent 6103 of the front revolving camera blocker 610. Planar surface 6104 can be flush or below planar surface 6012, if desired. Should additional friction be needed and/or desired to control movement of the front revolving blocker 610, then the planar surface 6104 could be positioned above the planar surface 6012.

Figure 54:
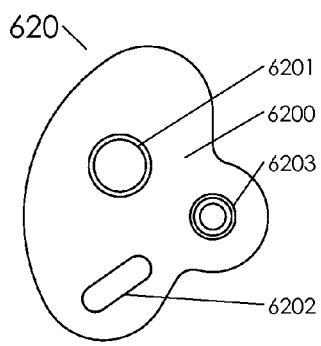
FIGS. 54-56 depict planar views of the rear revolving camera blocker of FIG. 50, from various orientations.
Figure 55:
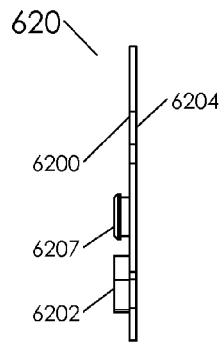
Figure 56:
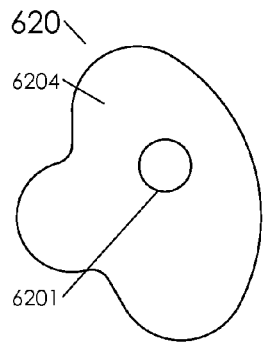
Figures 57, 58:
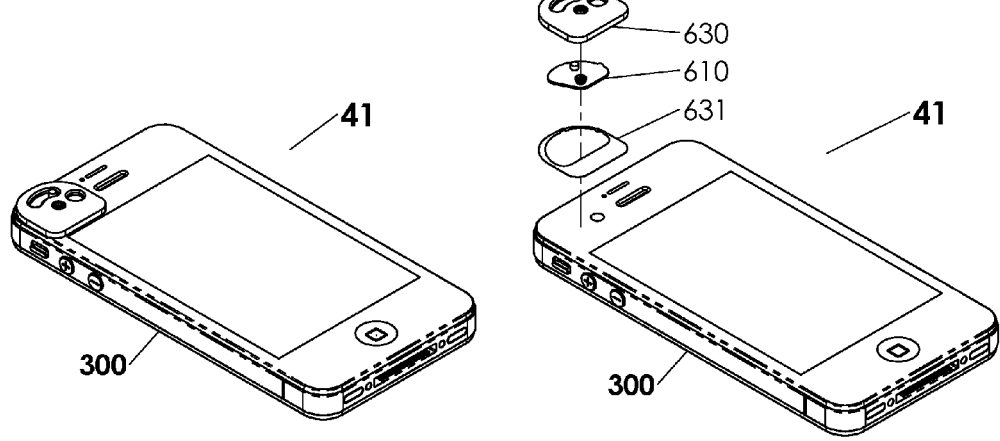
FIG. 57 depicts a front perspective view of an additional revolving shutter embodiment of the invention in the privacy position when attached directly to a mobile phone.
FIG. 58 depicts an exploded front perspective view of the embodiment of FIG. 57.
Figures 59, 60:
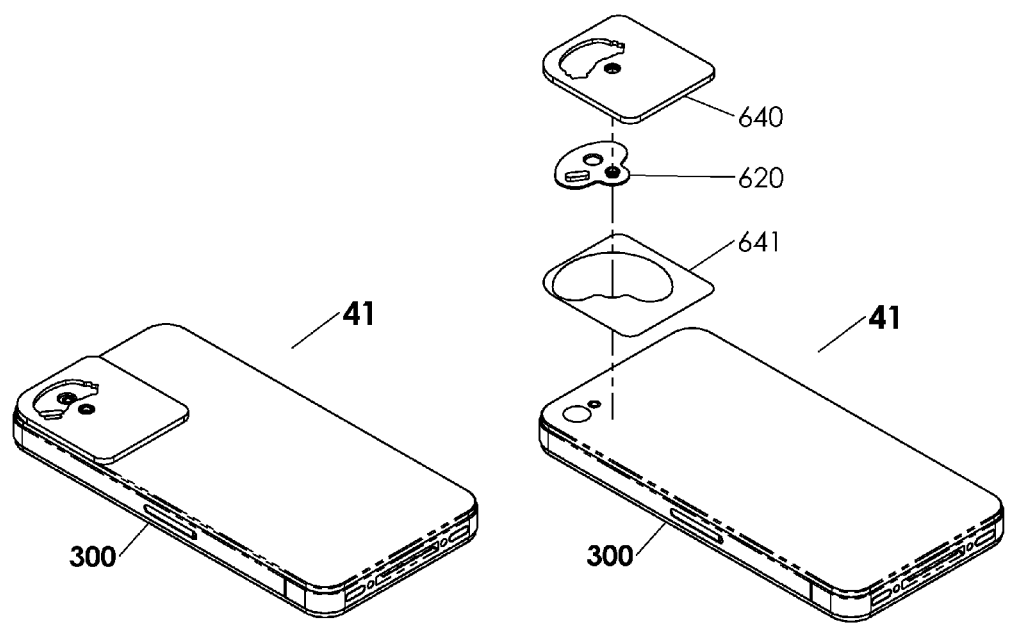
FIG. 59 depicts a rear perspective view of an additional revolving shutter embodiment of the invention in the non-privacy position when attached directly to a mobile phone.
FIG. 60 depicts an exploded front perspective view of the embodiment of FIG. 59.

FIGS. 54-56 depict planar views of the rear revolving camera blocker 620 of FIG. 50 from various orientations. In this embodiment, planar surface 6200 blocks the rear lens 3017 while the hole 6201 allows the light 3012 to operate normally when the lens 3017 is blocked. The rear revolving camera blocker 610 revolves around post 6203 that is captured in hole 6004 of the case 600. Also shown is the tab 6202 of the rear revolving camera blocker 620. Planar surface 6204 is flush or below planar surface 6013. Should additional friction be needed during the movement of the front revolving blocker 610, then the planar surface 6104 could be above planar surface 6013. To one skilled in the art it should be recognizable that the posts 6101 and 6203 could snap into position inside their mating features to retain them in the case 600, or could be removed all together and pivot on the profile of the blockers.

FIGS. 57-60 depicts front and rear, assembled and exploded, perspective views of an additional revolving shutter embodiment 41 of the invention, featuring a front revolving blocker 610 in the blocking, or closed position; a front camera blocker base 630 which is attached to the mobile phone 300 via an adhesive 631; a rear revolving blocker 620 in the blocking, or closed position and a rear camera blocker base 640 which is attached to the mobile phone 300 via an adhesive 641.

Figure 61:
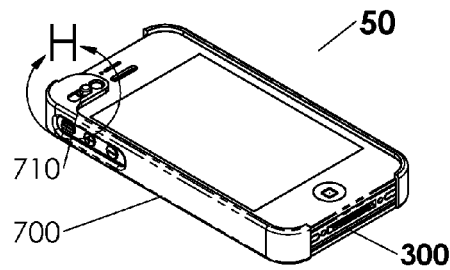
FIG. 61 depicts a front perspective view of an additional linear sliding shutter embodiment of the invention in the privacy position when attached to a case of a mobile phone.

FIG. 61 depicts a front perspective view of an additional embodiment 50 of the invention featuring a front sliding blocker 710 in the privacy position when attached to a case 700 of a mobile phone 300. A partial view is defined by the circle H.

Figure 62:
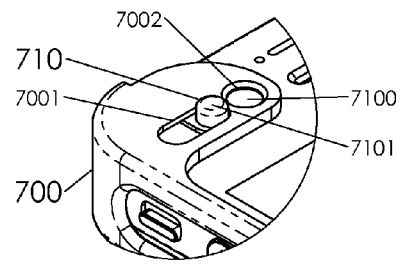
FIG. 62 is an enlarged partial view of the front perspective view of FIG. 61.

FIG. 62 is an enlarged partial view H of the front perspective view of FIG. 61, with detail depicting one example of how the front sliding blocker 710 can utilize surface 7100 to block the front camera lens 3015 of the PED, which in this embodiment is below the front camera opening 7002. This blocking function is possible when the post 7101 traverses to the end of the slot 7001 in a distal direction.

Figure 63:
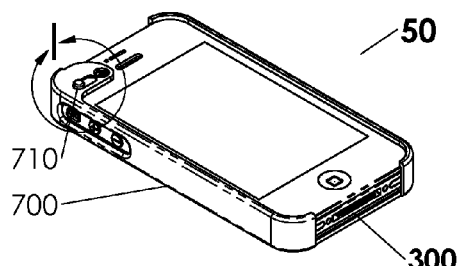
FIG. 63 depicts a front perspective view of an additional linear sliding shutter embodiment of the invention in the non-privacy position when attached to a case of a mobile phone.

FIG. 63 depicts a front perspective view of an additional embodiment 50 of the invention featuring a front sliding blocker 710 in the un-blocking, or opened, position when attached to a case 700 of a mobile phone 300. A partial view is defined by the circle I.

Figure 64:
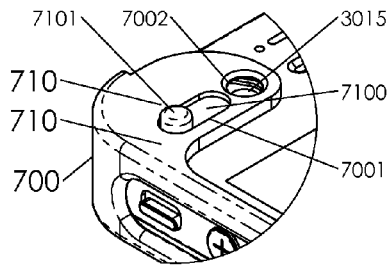
FIG. 64 is an enlarged partial view of the front perspective view of FIG. 63.

FIG. 64 is an enlarged partial view I of the front perspective view of FIG. 63, with detail depicting one example of how the sliding blocker's surface 7100 could slide to un-block the front camera lens 3015 of the PED, which could then be usable through front camera opening 7002. In this embodiment, the un-blocking function is possible when the post 7101 traverses to the end of the slot 7001 in a proximal direction.

Figure 65:
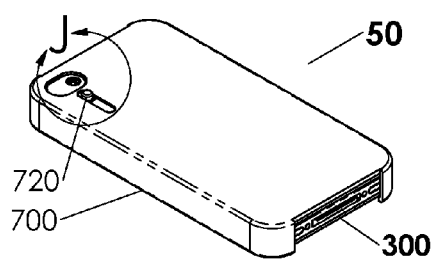
FIG. 65 depicts a rear perspective view of an additional linear sliding shutter embodiment of the invention in the privacy position when attached to a case of a mobile phone.

FIG. 65 depicts a rear perspective view of an additional embodiment 50 of the invention featuring a rear sliding blocker 720 in the privacy position when attached to a case 700 of a mobile phone 300. A partial view is defined by the circle J.

Figure 66:
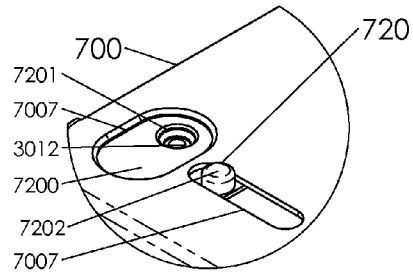
FIG. 66 is an enlarged partial view of the rear perspective view of FIG. 65.

FIG. 66 is an enlarged partial view J of the rear perspective view of FIG. 42, with detail depicting one example of how the rear sliding blocker 720 can utilize surface 7200 to block the rear camera lens 3017 of the PED, which in this embodiment is shown below the rear camera opening 7007. This blocking function is possible when the tab 7202 slides in a distal direction. Also shown is how the light 3012 of the phone 300 could be usable even when the camera lens 3017 was blocked by surface 7200, via the hole 7201 in the rear revolving sliding 720.

Figure 67:
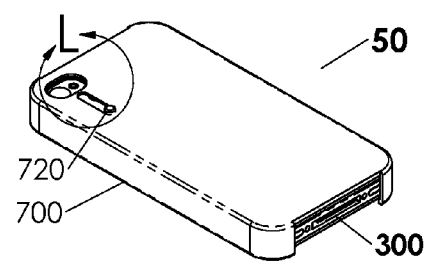
FIG. 67 depicts a rear perspective view of an additional linear sliding shutter embodiment of the invention in the non-privacy position when attached to a case of a mobile phone.

FIG. 67 depicts a rear perspective view of an additional embodiment 50 of the invention featuring a rear sliding blocker 720 in the un-blocking, or opened, position when attached to a case 700 of a mobile phone 300. A partial view is defined by the circle L.

Figure 68:
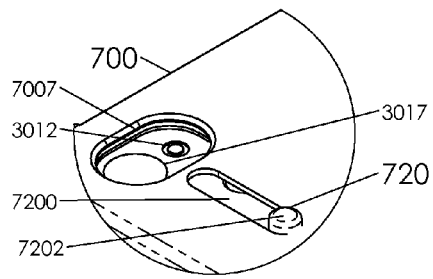
FIG. 68 is an enlarged partial view of the rear perspective view of FIG. 67.

FIG. 68 is an enlarged partial view L of the rear perspective view of FIG. 67, with detail depicting one example of how the rear sliding blocker 720 may be slid proximally to un-block the rear camera lens 3017 of the PED, which is visible in the rear camera opening 7007. Also shown is how the light 3012 of the phone 300 could be usable when the camera lens 3017 is un-blocked by surface 7200.

FIG. 69 depicts a top broken view of the sliding shutter embodiment 50 of FIG. 61, with the mobile phone removed, showing the front sliding blocker 710 and rear sliding blocker 720 in position.

FIG. 70 depicts an end view of the Case 700 of FIG. 61.

FIG. 71 is a broken sectional View M-M of FIG. 69, showing the front sliding blocker 710 and rear sliding blocker 710 contained in cavities 7015 and 7012 respectively.

Figure 76:
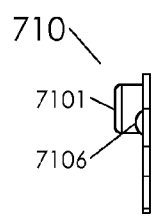
Figure 77:
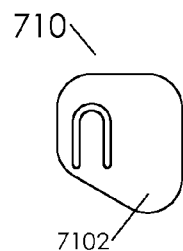
Figure 78:
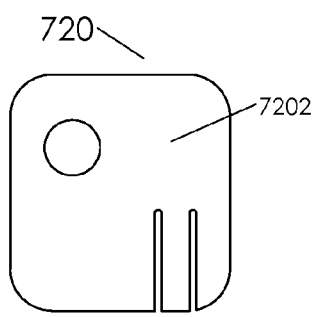
FIGS. 78-80 depict planar views of the rear sliding camera blocker of FIG. 74 from various orientations.
Figure 79:
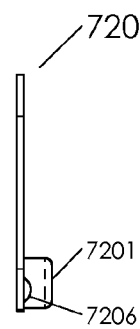

FIG. 72 depicts a partial broken sectional View N-N of the Case 700 of FIG. 70, showing the front cavity 7015 below planar surface 7016, which contains the front sliding blocker 710 (not shown). In this embodiment, the planar surface 7003 of the front cavity 7015 has two female divots 7004 and 7006. Female divot 7004 mates with the male bump 7106 of front sliding blocker 710 (see FIG. 76) when the front sliding blocker 710 is in the blocking position (see FIG. 61). Female divot 7006 mates with the male bump 7106 of front sliding blocker 710 (see FIG. 76) when the front sliding blocker 710 is in the un-blocking position (see FIG. 63). Between the two female divots there may be a female channel 7005 that allows the male bump 7106 to move freely between the female divots, thereby creating a tactile feedback when the male bump 7106 falls into the female divots. In the depicted embodiment, there is a smaller opening or lip defined by periphery walls 7014 which desirably prevents the front sliding blocker 720 from falling out of position.

Figure 80:
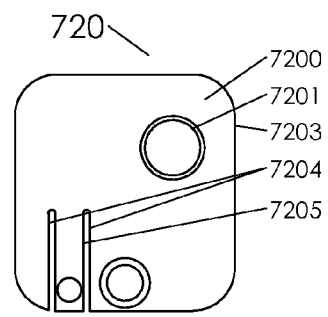

FIG. 73 depicts a partial broken sectional View O-O of the Case 700 of FIG. 70, showing the rear cavity 7012 below planar surface 7017, which contains the rear sliding blocker 720 (not shown). The planar surface 7018 of the rear cavity 7012 has two female divots 7009 and 7013. Female divot 7009 mates with the male bump 7206 of rear sliding blocker 720 (see FIG. 80) when the rear sliding blocker 720 is in the blocking position (see FIG. 65). Female divot 7013 mates with the male bump 7206 of rear sliding blocker 720 (see FIG. 80) when the rear sliding blocker 720 is in the un-blocking position (see FIG. 65). In the disclosed embodiment, between the two female divots there is a female channel 7010 that allows the male bump 7206 to move freely between the female divots and create a tactile feedback when the male bump 7206 falls into the female divots. There is a smaller opening or lip defined by periphery walls 7011 which prevents the rear sliding blocker 720 from falling out of position.

It should be appreciated by those skilled in the art that the smaller openings defined by periphery walls 7014 and 7011 are not necessarily required for the embodiment to operate as described when the embodiment 50 is fully assembled, since the presence of the PED 300 itself could prevent the blockers 720 and 710 from falling out. It should also be appreciated by those skilled in the art that the female divots 7004, 7006, 7009, 7013 and female channels 7005 and 7010 are not necessarily required in various embodiment for the invention to operate in the blocking and un-blocking positions.

Figure 74:
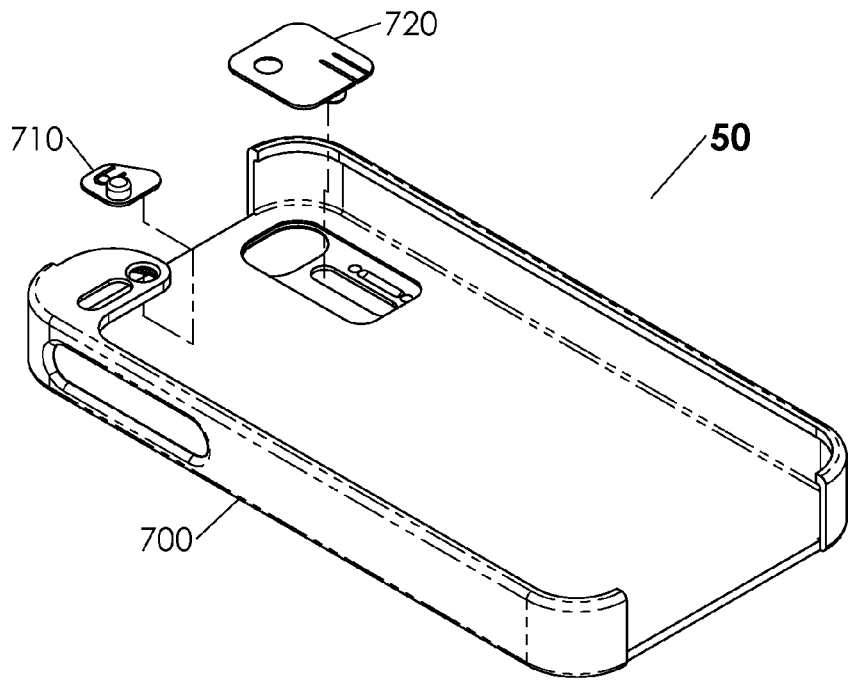
FIG. 74 depicts an exploded front perspective view of the embodiment of FIG. 61, with the mobile phone removed.
Figure 75:
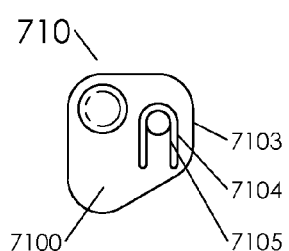
FIGS. 75-77 depict planar views of the front sliding camera blocker of FIG. 74 from various orientations.

FIG. 74 depicts an exploded front perspective view of the sliding shutter embodiment of FIG. 61, with the mobile phone 300 removed, showing the front sliding blocker 710 and rear sliding blocker 720 on place in the case 700.

FIGS. 75-80 depict planar views of the front sliding camera blocker 710 and rear camera sliding blocker 720 of FIG. 74 from various orientations. In these views are the spring tabs 7105 and 7205, which are defined by slots 7104 and 7204, respectively. These spring tabs might be desirable when the material used to manufacture the sliding blockers may be too stiff to flex on their own when the blockers are moved from privacy to non-privacy positions. To those of ordinary skill in the art, it should be understood that the use of other biasing devices could be employed in place of the spring tabs.

Figure 81:
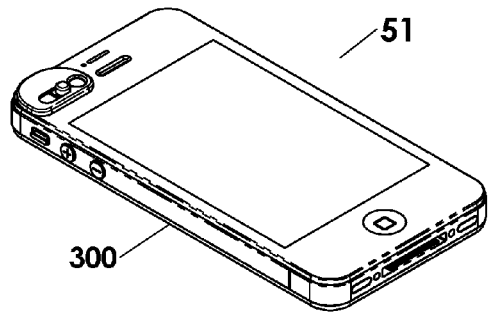
FIG. 81 depicts a front perspective view of an additional sliding shutter embodiment of the invention in the privacy position when attached directly to a mobile phone.
Figure 83:
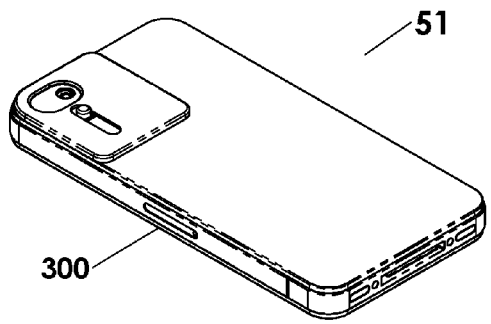
FIG. 83 depicts a rear perspective view of an additional sliding shutter embodiment of the invention in the privacy position when attached directly to a mobile phone.

FIGS. 81 and 83 depict front and rear perspective views of an additional sliding blocker embodiment 51 of the invention in the privacy position, where the front camera blocker base 730 and rear camera blocker base 740 are attached directly to a mobile phone or PED 300.

Figure 82:
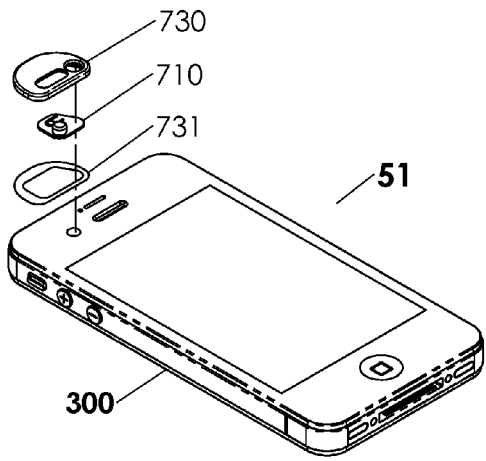
FIG. 82 depicts an exploded front perspective view of the embodiment of FIG. 81.
Figure 84:
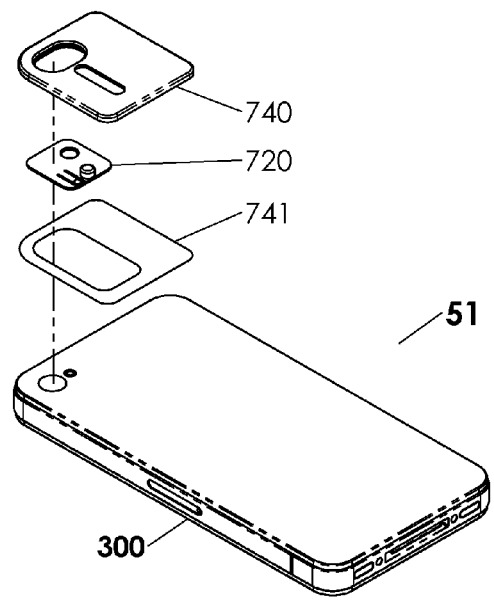
FIG. 84 depicts an exploded front perspective view of the embodiment of FIG. 83.

FIGS. 82 and 84 depict exploded front and rear perspective views of the embodiment 51, where the front camera blocker base 730 is attached to the mobile phone 300 via an adhesive 731 and the rear camera blocker base 740 is attached to the mobile phone 300 via an adhesive 741.

Figure 85:
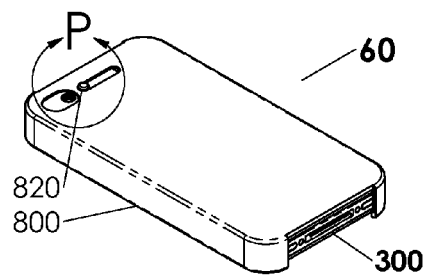
FIG. 85 depicts a rear perspective view of an additional linear sliding shutter embodiment of the invention in the privacy position when attached to a case of a mobile phone.
Figure 86:
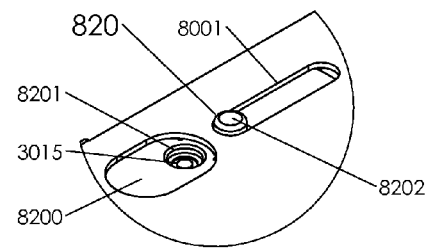
FIG. 86 is an enlarged partial view of the rear perspective view of FIG. 85.
Figure 87:
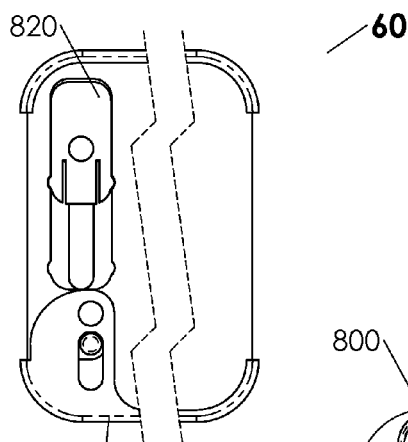
FIG. 87 depicts a top broken view of the linear sliding shutter embodiment of FIG. 85 with the mobile phone removed.
Figure 88:
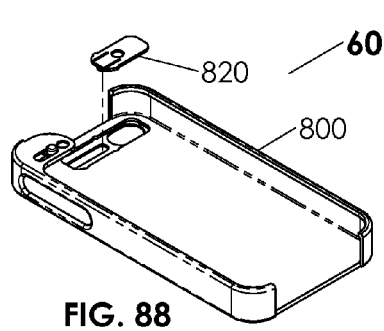
FIG. 88 depicts an exploded front perspective view of the embodiment of FIG. 85, with the mobile phone removed.
Figure 89:
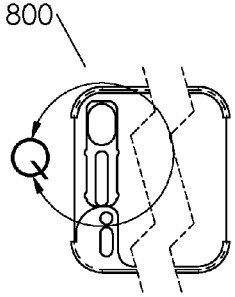
FIG. 89 depicts a top broken view of the case of FIG. 85.
Figure 90:
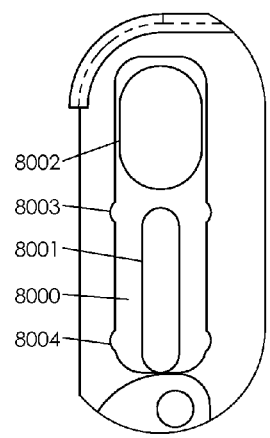
FIG. 90 depicts an enlarged partial view of the case of FIG. 89.
Figure 91:
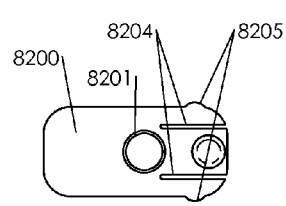
FIGS. 91-93 depict planar views of the rear sliding camera blocker of FIG. 85, from various orientations.
Figure 92:
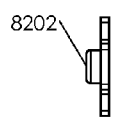
Figure 93:
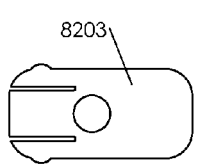

FIG. 85 depicts a rear perspective view of an additional linear sliding shutter embodiment 60 of the invention in the privacy position, when attached to a case of a mobile phone. The operation of the slidable camera blocker 820 can be substantially similar to the operation of embodiments 50 and 51, but this embodiment utilizes a slidable shutter, not constrained by an additional lip like 7011 shown in FIG. 73 or a series of bumps and divots that are used in embodiments 50 and 51. The shutter 820 can be held into position by the presence of the PED 300, and desirably slides within a channel defined by planar face 8000 (see FIGS. 87-90). In this embodiment, there can be female radial detents 8003 and 8004 in the channel that hold the shutter 820 in the privacy and non-privacy positions when the male radial detents 8205 (see FIG. 91) are positioned accordingly. Slots 8204 can allow the male detents 8205 to move freely when sliding between female detents 8003 and 8004 of the case 800. The hole 8201 desirably allows the normal use of the light 3015 of the PED 300 when the shutter 820 is in the privacy position.

Figure 94:
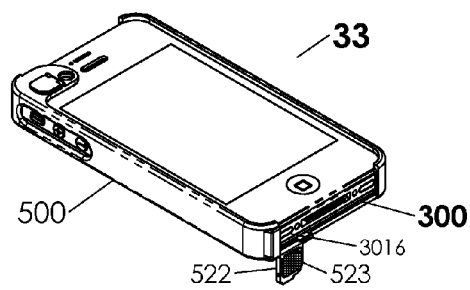
FIGS. 94-96 depict perspective views of another alternative embodiment of a privacy case, incorporating a sound-deadening material in the blocker, which can be particularly useful with a microphone feature of the PED.
Figure 95:
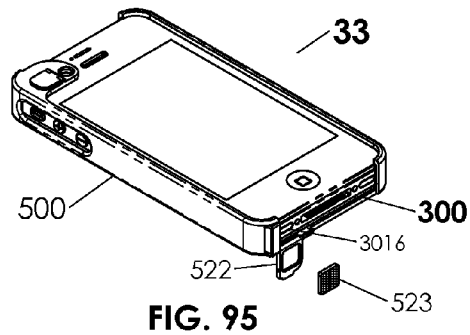
Figure 96:
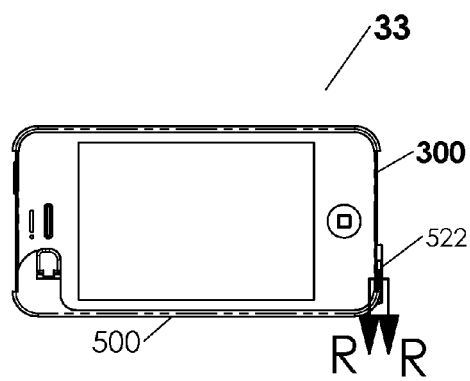
Figure 97:
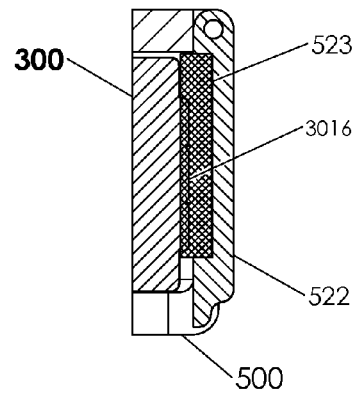
FIG. 97 is a cross-sectional view of the privacy blocker, case and PED of FIG. 96, viewed along line R-R.

FIGS. 94-96 depict various views of an additional embodiment of the invention in the privacy position, when attached to a case 500 of a mobile phone. In this embodiment, a microphone blocking door 522 is depicted in the hinged unblocking or open position. In this embodiment, the door 522 can include a sound-absorbent and/or deadening material 523, which desirably muffles or otherwise reduces or prevents the ability of the microphone to detect ambient noises. In various embodiments, closure of the door 522 can force the material 523 into contact with the PED 300 and/or PED microphone 3016, to effectuate a seal and/or encompass the sensor device (see FIG. 97).

ALTERNATIVE CONFIGURATIONS

The various components described herein may be formed in a variety of shapes, sizes and/or configurations. For example, the removable embodiments 100 and 200 may be formed in a variety of shapes and configurations, which will desirably facilitate the use on a PED. Similarly, the various features described herein could include features that optically interfere with a camera's field of view and/or operation, such as a door or window that uses an electrical charge or other technology to become clear or opaque at a user's option. If desired, the various blockers could include features that impede and/or alter the optical information gathered by a camera or other sensor, including reducing the amount of gathered light as well as filtering, magnifying and/or reducing the field of view of the camera. If desired, a blocker may include three or more positions, such that the camera can be obscured in one position, the viewpoint altered in a second position, and the camera unblocked in the third position. It is also readily apparent to those of ordinary skill that the use of hook and eye (i.e. Velcro) or other types of connection methods can be used in place of the adhesive described herein without departing from the sprit or essential character of the invention.

INCORPORATION BY REFERENCE

The entire disclosure of each of the publications, patent documents, and other references referred to herein is incorporated herein by reference in its entirety for all purposes to the same extent as if each individual source were individually denoted as being incorporated by reference.

EQUIVALENTS

The invention may be embodied in other specific forms without departing from the spirit or essential characteristics thereof. The foregoing embodiments are therefore to be considered in all respects illustrative rather than limiting on the invention described herein. The scope of the invention is thus intended to include all changes that come within the meaning and range of equivalency of the descriptions provided herein.

Many of the aspects and advantages of the present invention may be more clearly understood and appreciated by reference to the accompanying drawings. The accompanying drawings are incorporated herein and form a part of the specification, illustrating embodiments of the present invention and together with the description, disclose the principles of the invention.

Although the foregoing inventions have been described in some detail by way of illustration and example for purposes of clarity of understanding, it will be readily apparent to those of ordinary skill in the art in light of the teachings of this invention that certain changes and modifications may be made thereto without departing from the spirit or scope of the disclosure herein.

We claim:

1. A device for attachment to a portable electronic device (PED) proximate to a sensor of the PED, comprising:
   a first element for positioning adjacent to the sensor of the PED; and
   a second element rotably attached to the first element, the second element moveable between a first position and a second position, the second element including at least one surface that substantially interferes with the operation of the sensor when the second element is in the first position, and the at least one surface does not substantially interfere with the operation of the sensor when the second element is in the second position.

2. The device of claim 1, wherein the sensor is selected from a group consisting of a camera, a location sensor, a microphone and any combination thereof.

3. The device of claim 1, wherein the first element is a case for the PED.

4. The device of claim 1, wherein the first element is attached to an outer surface of the PED by a connecting means.

5. The device of claim 1, wherein the rotatably attached comprises a hinge, a revolving shutter or a revolving blocker.

6. A device for attachment to a portable electronic device (PED) proximate to a plurality of camera sensors of the PED, comprising:
   a first element for connecting to the PED; and
   a second element rotably attached to the first element, the second element moveable between a first position and a second position, the second element including a first surface that substantially interferes with the operation of a first camera of the PED and a second surface that substantially interferes with the operation of a second camera of the PED when the second element is in the first position, and the first and second surfaces do not substantially interfere with the operation of the first and second cameras when the second element is in the second position.

7. The device of claim 6, wherein the first camera is positioned on a first side of the PED and the second camera is positioned on an opposing side of the PED.

8. The device of claim 6, wherein the second element is removably attached to the first element.

9. The device of claim 6, wherein the first element is a case for the PED.

10. The device of claim 6, further including a third element rotably attached to the first element, the third element moveable between a third position and a fourth position, the third element including a third surface that substantially insulates the microphone from ambient sounds in a proximity to the microphone when the third element is in the third position, and the third surface does not substantially insulate the microphone from ambient sounds in a proximity to the microphone when the third element is in the fourth position.

11. The device of claim 10, wherein the third surface comprises a sound-deadening material.

12. The device of claim 6, wherein the rotatably attached comprises a hinge, a revolving shutter or a revolving blocker.

13. A device for attachment to a portable electronic device (PED) proximate to a sensor of the PED, comprising:
   a first element for positioning adjacent to the sensor of the PED; and
   a second element connected to the first element, the second element having at least one slot that is configured to receive at least one sliding component, sliding component moveable between a first position and a second position, the second element including at least one surface that substantially interferes with the operation of the sensor when the second element is in the first position, and the at least one surface does not substantially interfere with the operation of the sensor when the second element is in the second position.

14. The device of claim 13, wherein the sensor is selected from a group consisting of a camera, a location sensor, a microphone and any combination thereof.

15. The device of claim 13, wherein the at least one sliding component comprises a post or a blocking cover.

16. The device of claim 13, wherein the first element is a case for the PED.

* * * * *